(12) United States Patent
Kobayashi et al.

(10) Patent No.: US 6,633,027 B2
(45) Date of Patent: Oct. 14, 2003

(54) VEHICLE HEADLAMP SYSTEM

(75) Inventors: Shoji Kobayashi, Shizuoka (JP); Takashi Inoue, Shizuoka (JP); Kazuhiro Suzuki, Shizuoka (JP); Yutaka Nakanishi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 238 days.

(21) Appl. No.: 09/924,557

(22) Filed: Aug. 9, 2001

(65) Prior Publication Data

US 2002/0039295 A1 Apr. 4, 2002

(30) Foreign Application Priority Data

Aug. 9, 2000 (JP) ........................................ 2000-240724

(51) Int. Cl.⁷ ............................................... H01L 27/00
(52) U.S. Cl. ........................ 250/208.1; 362/465; 315/82
(58) Field of Search ......................... 250/208.1; 362/37, 362/459, 460, 464, 468; 340/988, 996; 315/82

(56) References Cited

U.S. PATENT DOCUMENTS

| | | | | | |
|---|---|---|---|---|---|
| 4,768,135 | A | * | 8/1988 | Kretschmer et al. | 362/66 |
| 4,858,080 | A | * | 8/1989 | Oikawa | 362/466 |
| 5,562,336 | A | * | 10/1996 | Gotou | 362/37 |
| 5,588,733 | A | * | 12/1996 | Gotou | 362/37 |
| 6,049,749 | A | * | 4/2000 | Kobayashi | 701/49 |
| 2002/0036907 | A1 | * | 3/2002 | Kobayashi et al. | 362/464 |

* cited by examiner

*Primary Examiner*—Thanh X. Luu
(74) *Attorney, Agent, or Firm*—Sughrue Mion, PLLC

(57) ABSTRACT

Beam control over headlamps is performed with the arriving position, a predetermined time later from the present time, as a target position. At this time, the radius of curvature of a traveling road ahead of a vehicle is calculated on the basis of data from a navigation unit, and the arriving position of one's own vehicle is estimated on the basis of an advisable vehicle speed corresponding to the radius of curvature. Thus, the arriving position of one's own vehicle can accurately be estimated by taking into consideration variation in vehicle speed that is likely to occur in the near future.

16 Claims, 16 Drawing Sheets

ROAD CONFIGURATION CONTROL MODE

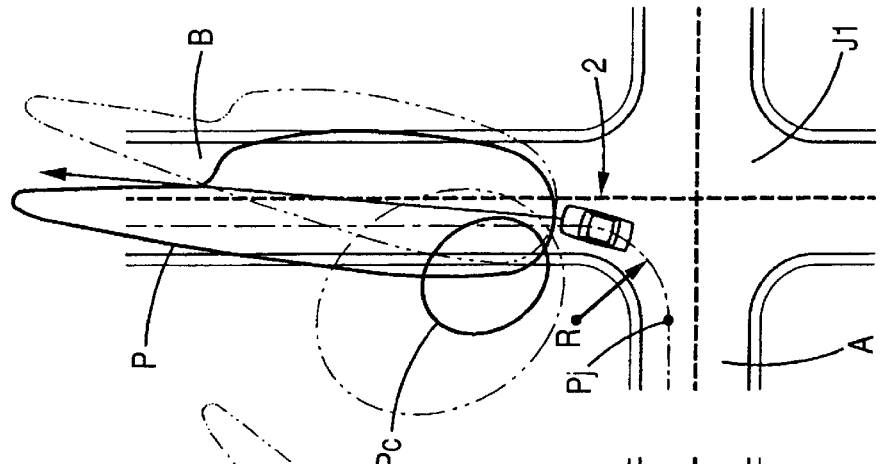

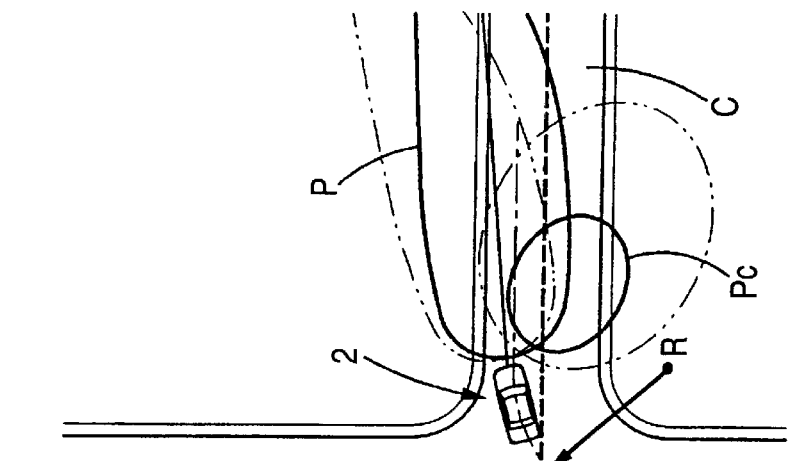
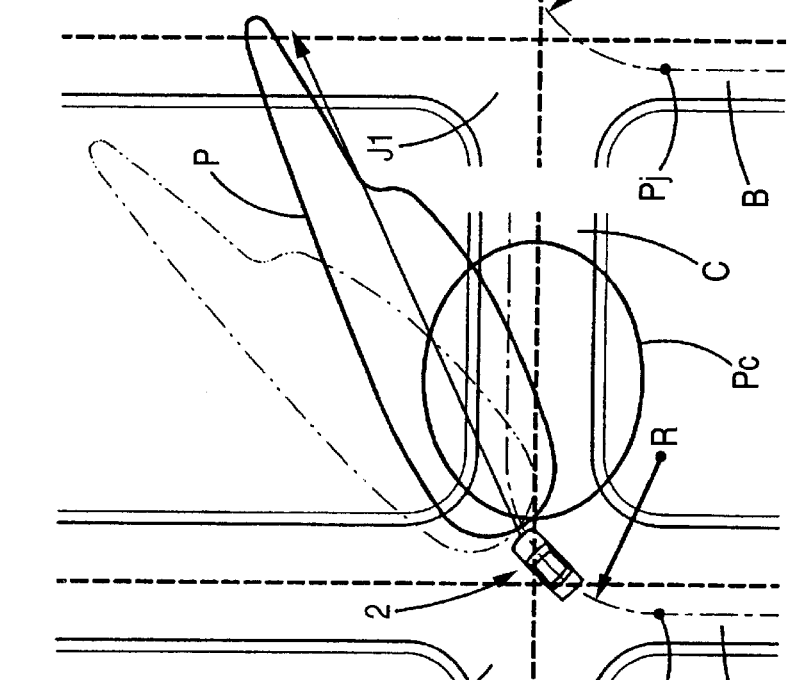
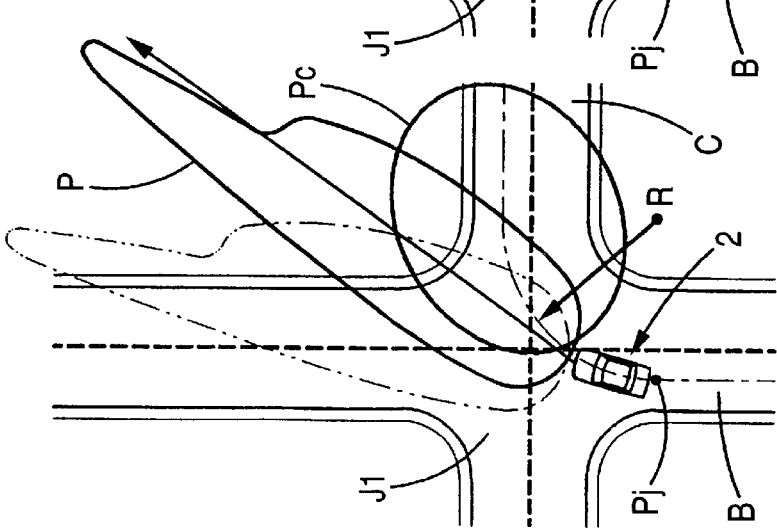
FIG. 6(a) TURNING ANGLE CORRESPONDING MODE (TURNING RIGHT)
FIG. 6(b) TURNING ANGLE CORRESPONDING MODE (TURNING RIGHT)
FIG. 6(c) TURNING ANGLE CORRESPONDING MODE (TURNING RIGHT)

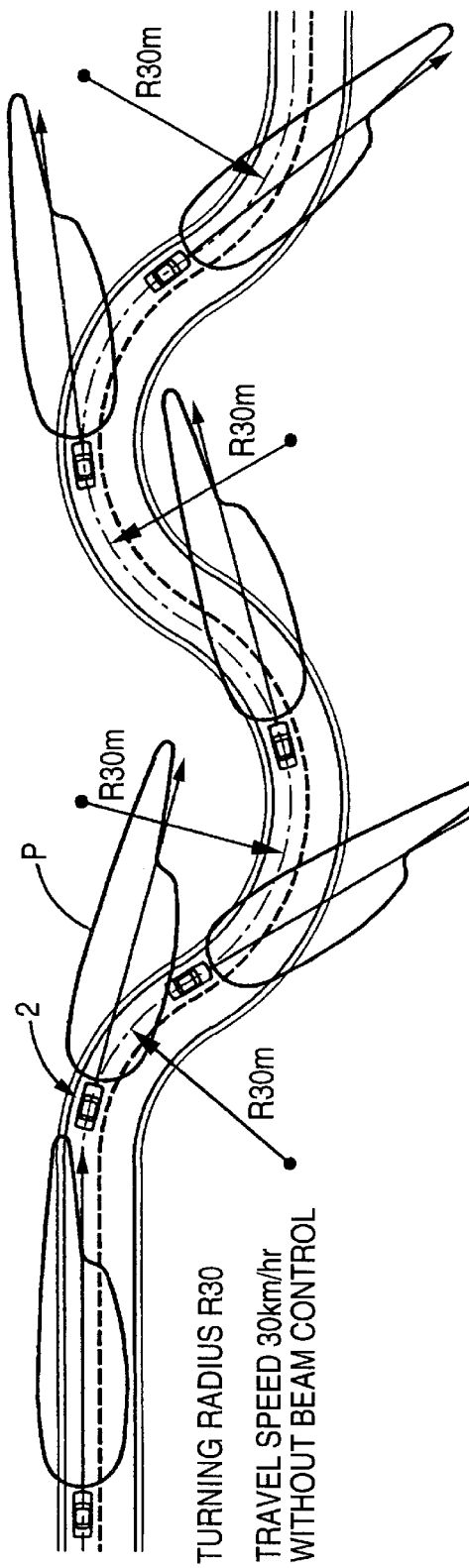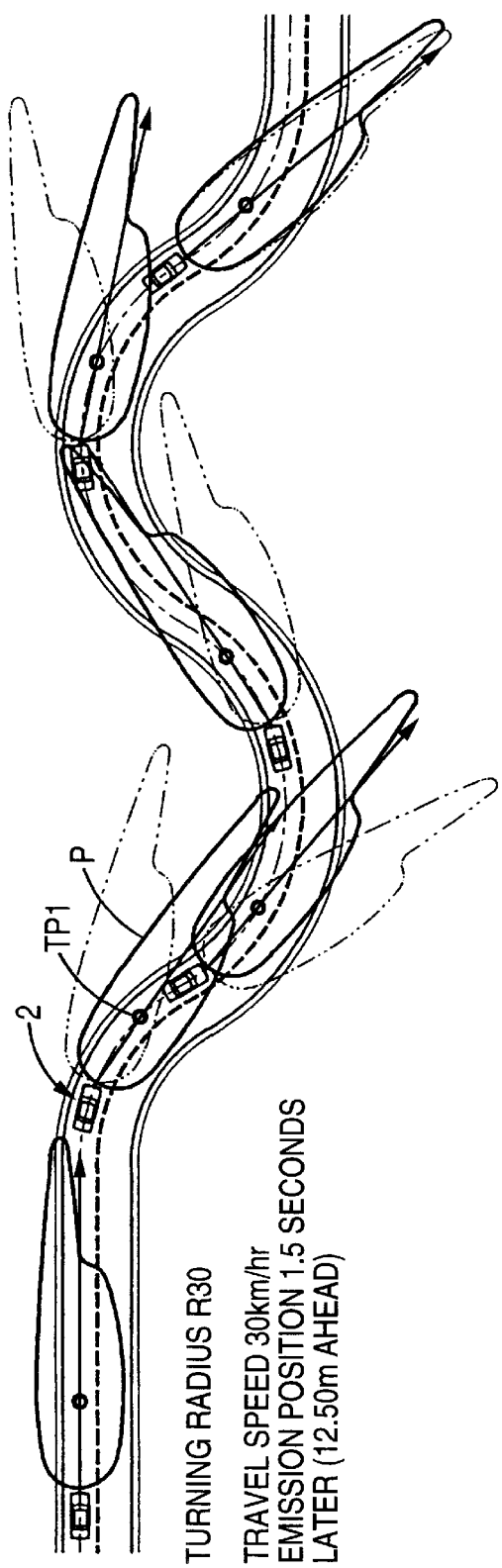
FIG. 8(a) TURNING RADIUS R30 TRAVEL SPEED 30km/hr WITHOUT BEAM CONTROL
FIG. 8(b) TURNING RADIUS R30 TRAVEL SPEED 30km/hr EMISSION POSITION 1.5 SECONDS LATER (12.50m AHEAD)

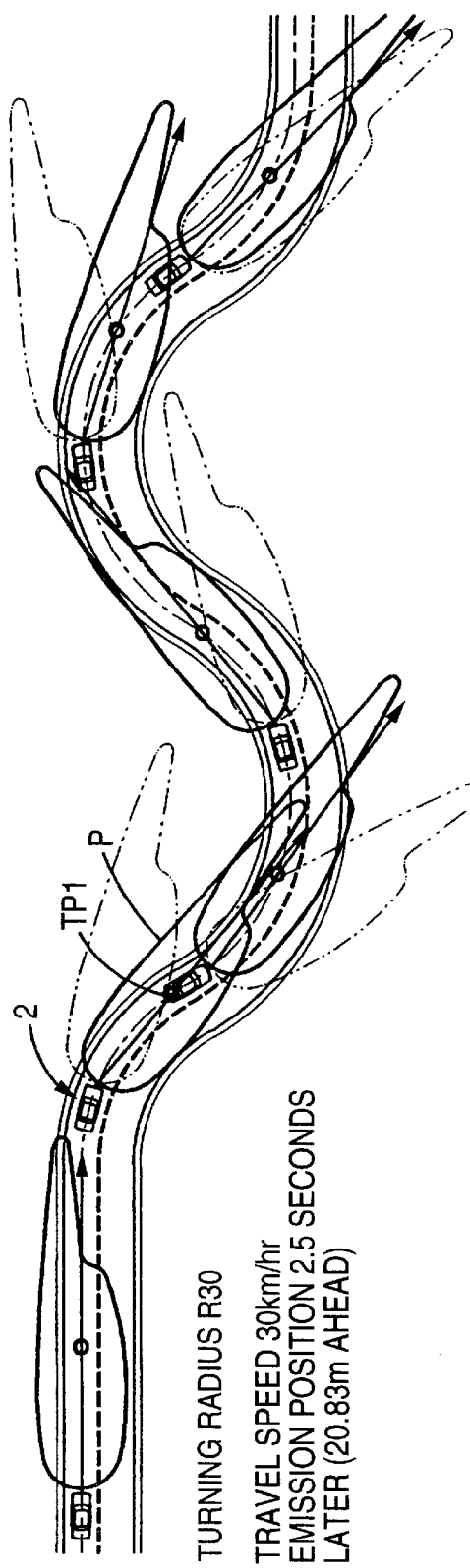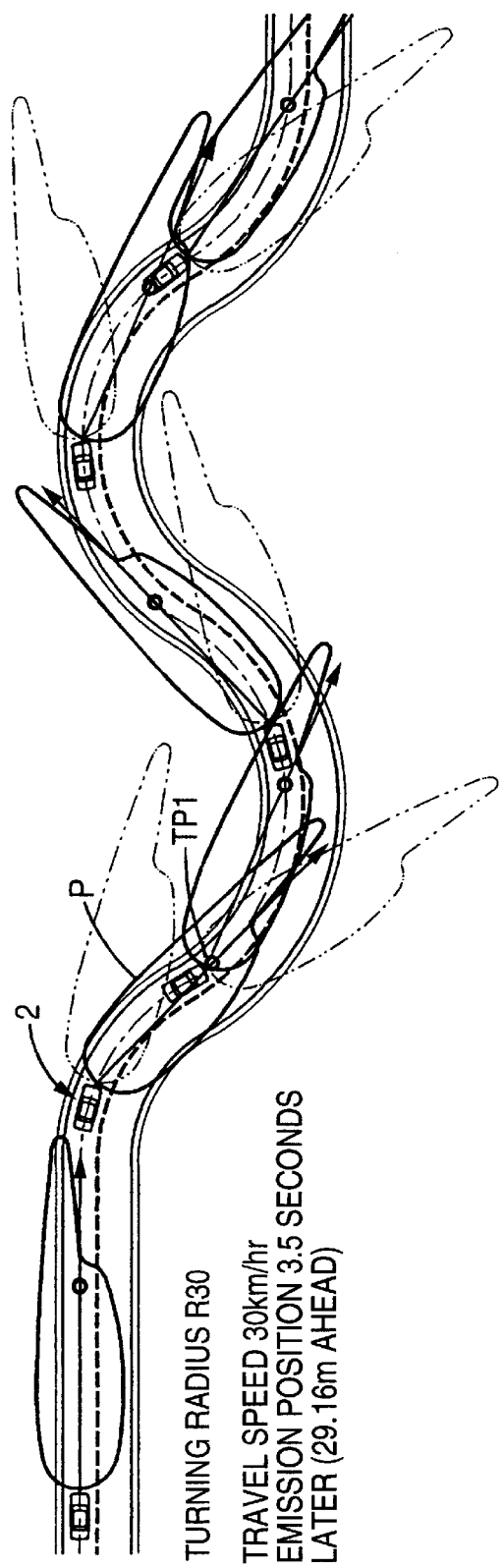

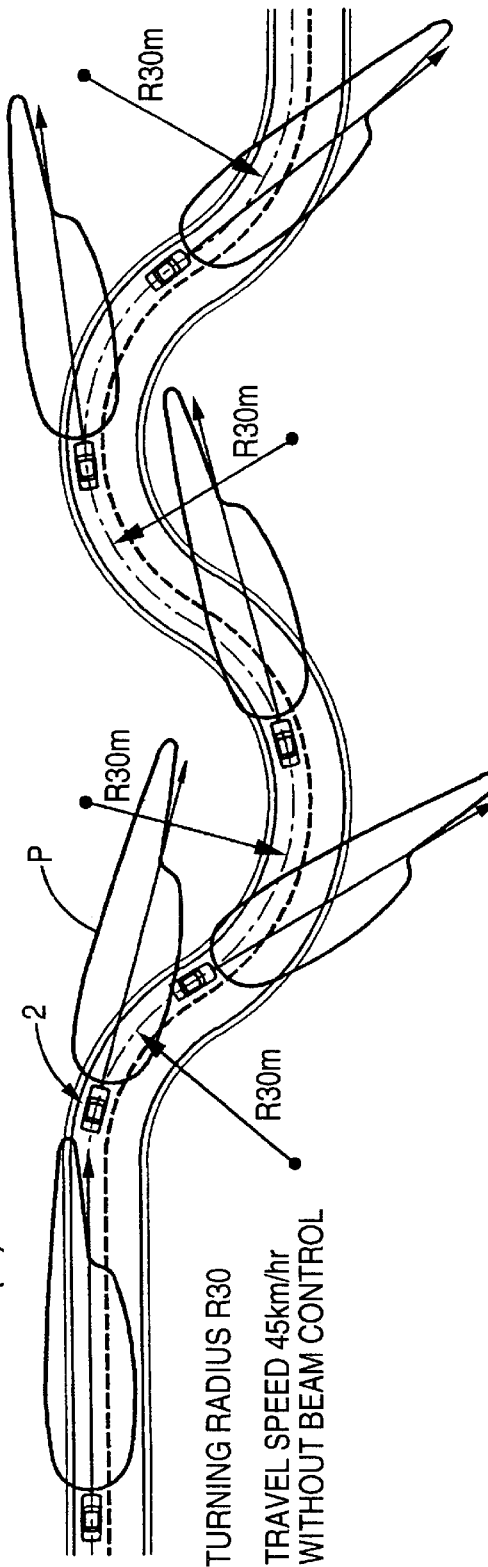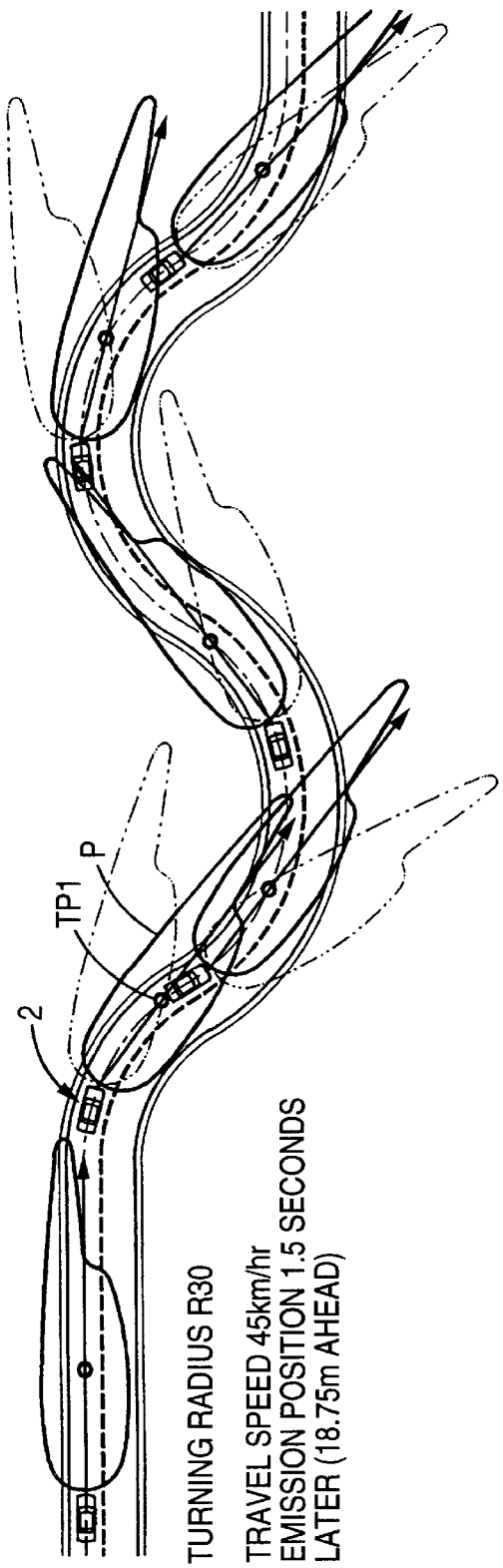

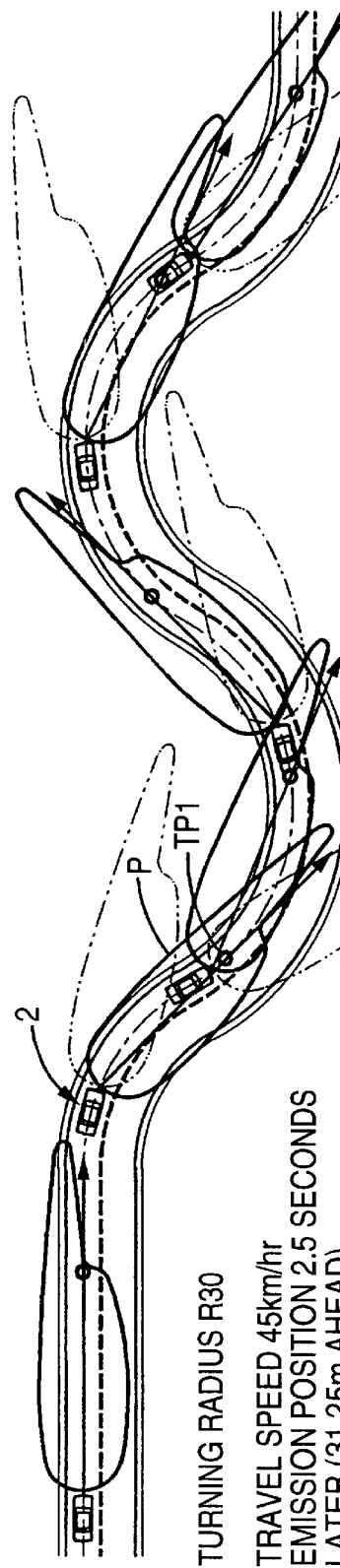
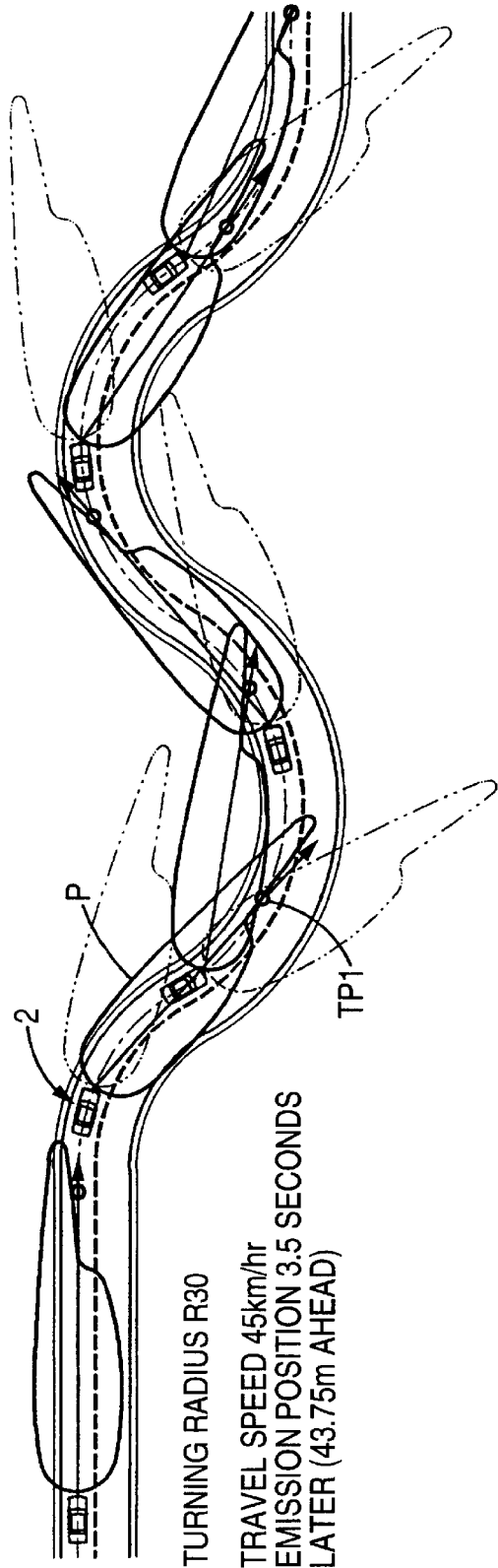
FIG. 11(a)
TURNING RADIUS R30
TRAVEL SPEED 45km/hr
EMISSION POSITION 2.5 SECONDS LATER (31.25m AHEAD)
FIG. 11(b)
TURNING RADIUS R30
TRAVEL SPEED 45km/hr
EMISSION POSITION 3.5 SECONDS LATER (43.75m AHEAD)

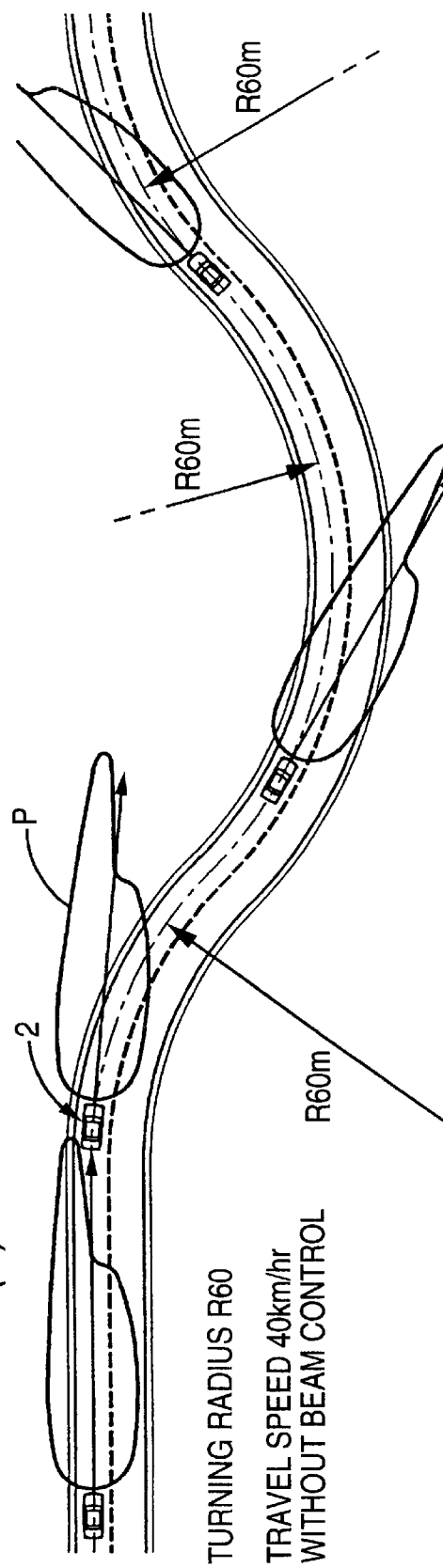
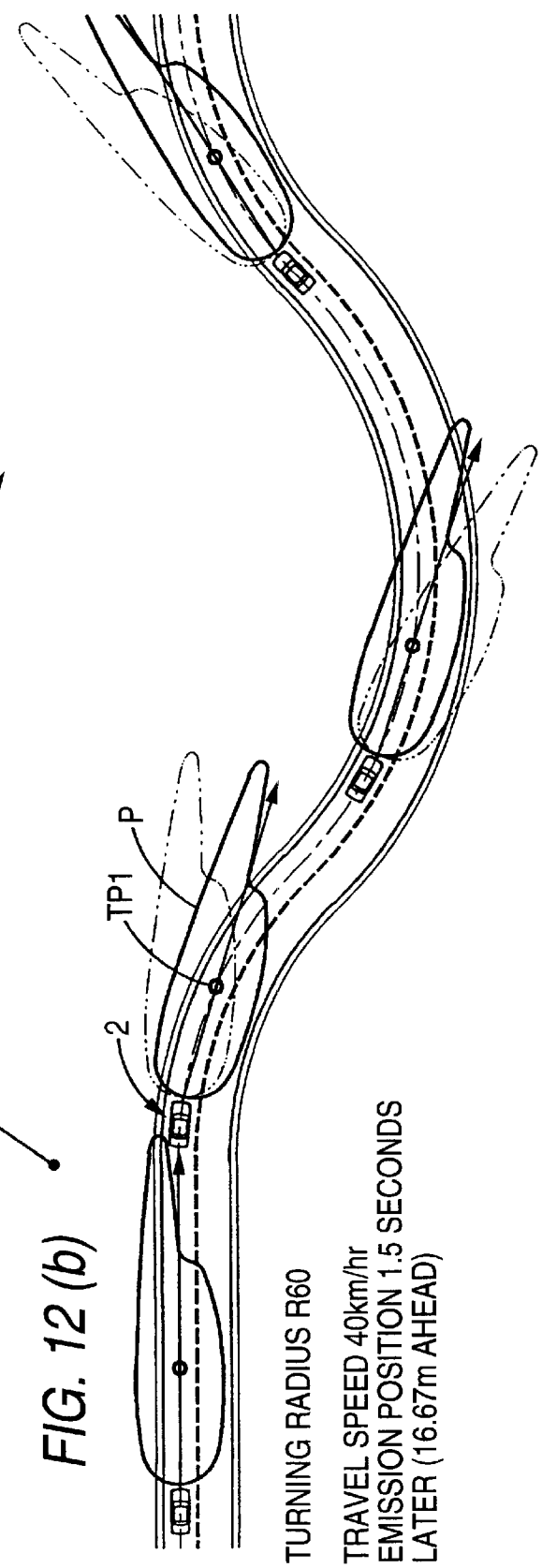
FIG. 12 (a)
TURNING RADIUS R60
TRAVEL SPEED 40km/hr
WITHOUT BEAM CONTROL
FIG. 12 (b)
TURNING RADIUS R60
TRAVEL SPEED 40km/hr
EMISSION POSITION 1.5 SECONDS LATER (16.67m AHEAD)

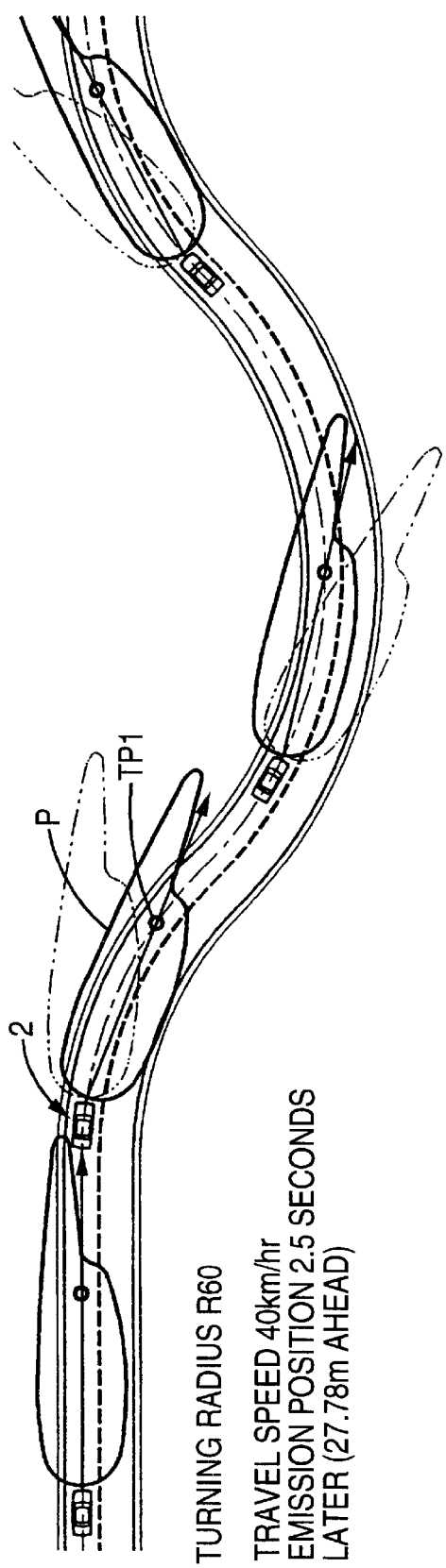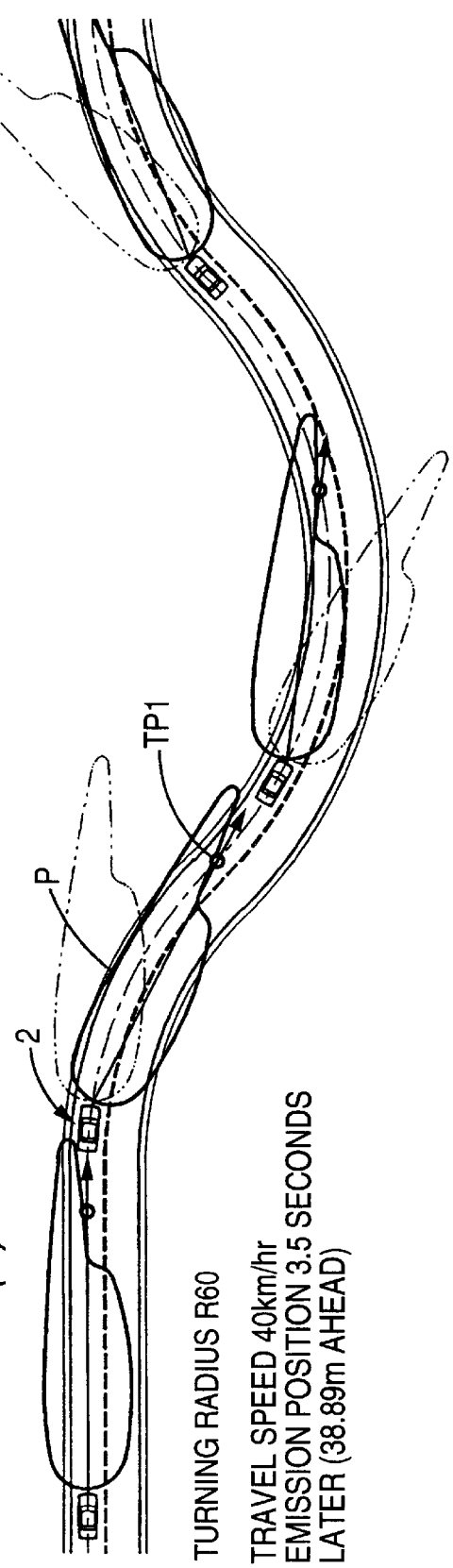

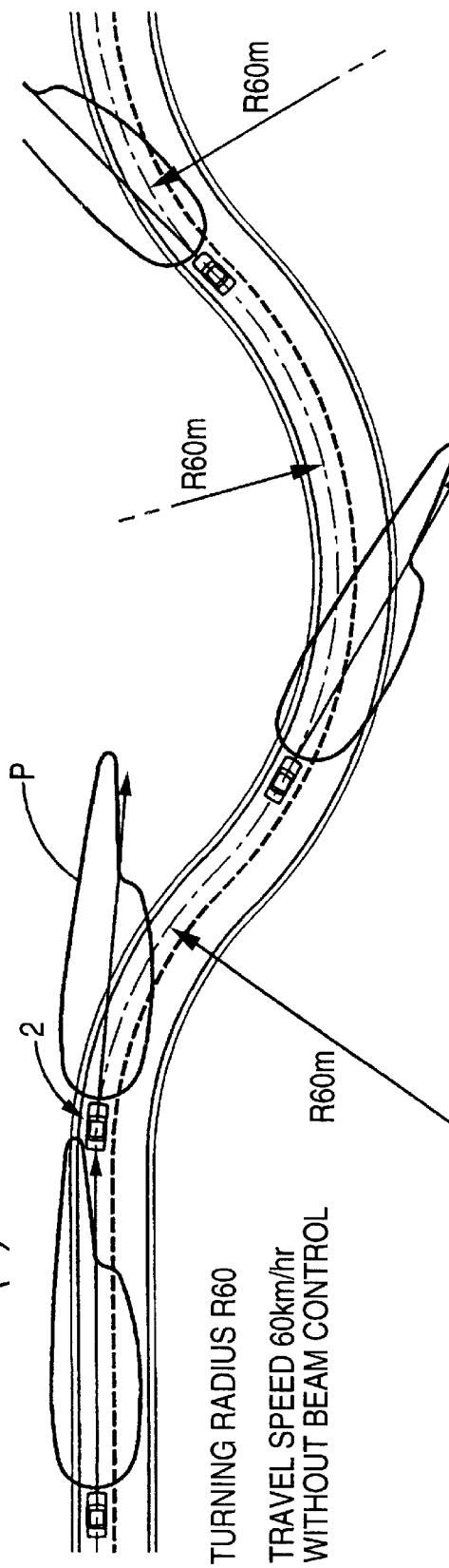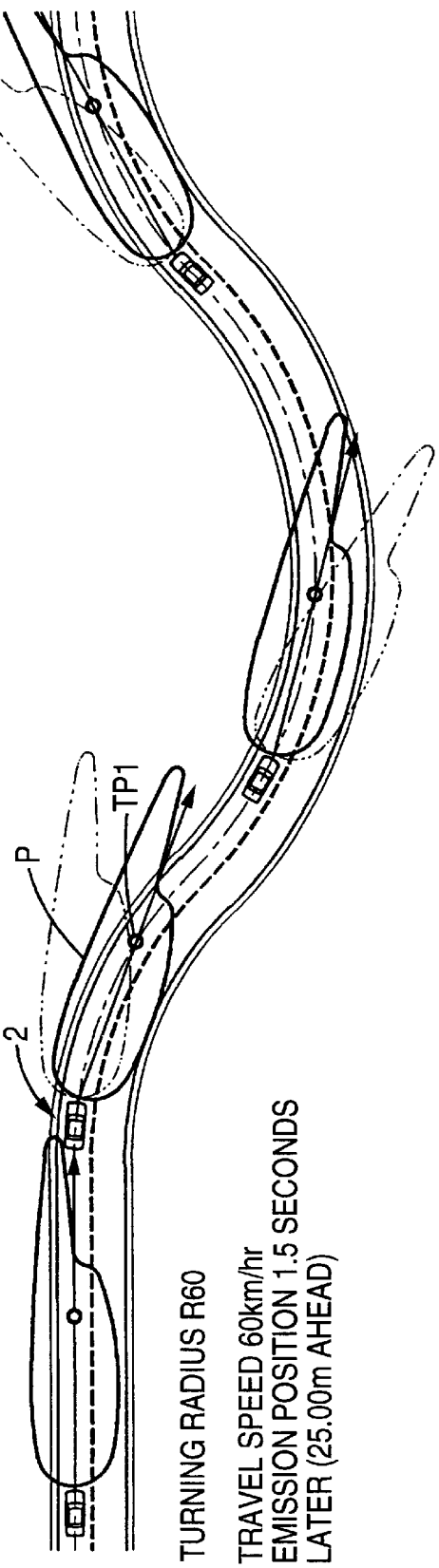
FIG. 14 (a) TURNING RADIUS R60 TRAVEL SPEED 60km/hr WITHOUT BEAM CONTROL
FIG. 14 (b) TURNING RADIUS R60 TRAVEL SPEED 60km/hr EMISSION POSITION 1.5 SECONDS LATER (25.00m AHEAD)

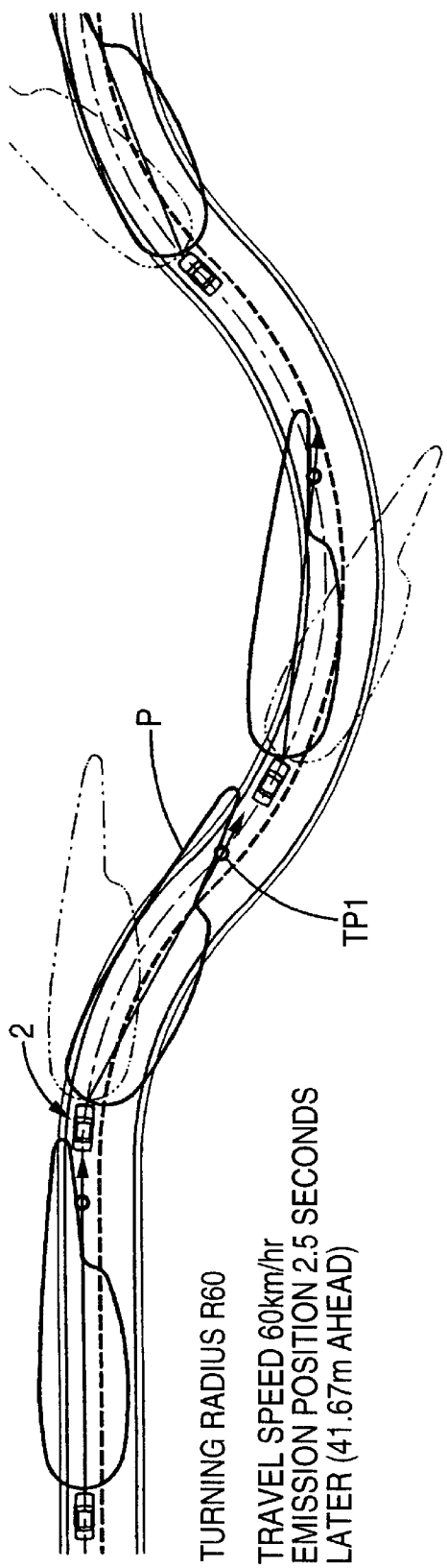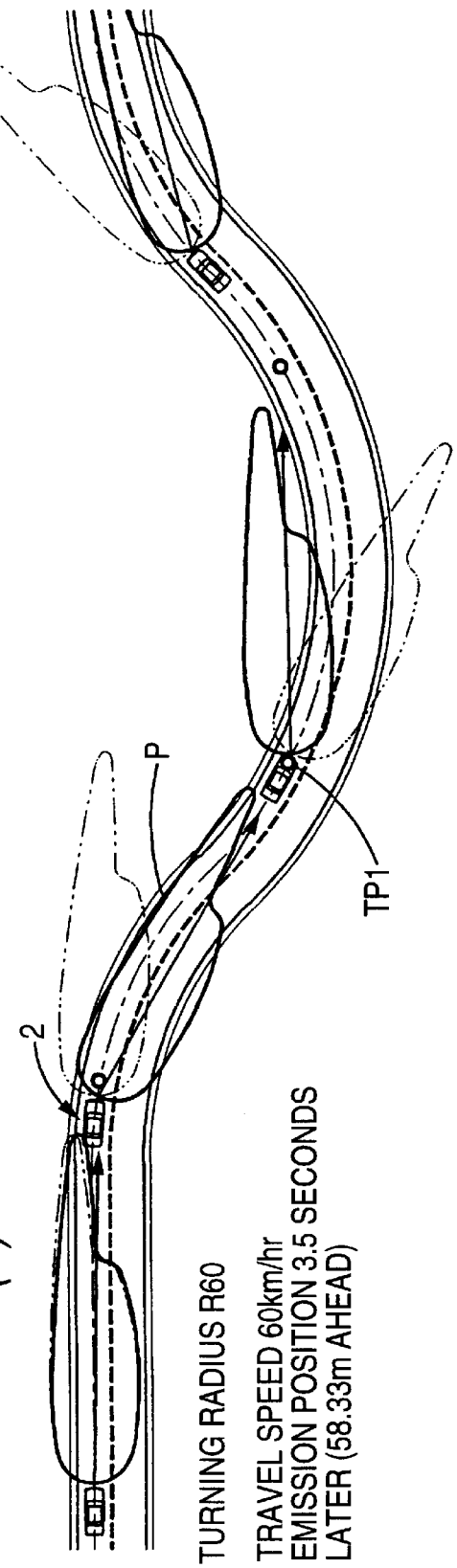

VEHICLE HEADLAMP SYSTEM

BACKGROUND OF THE INVENTION

1. Field of the Invention

The present invention relates to a vehicle headlamp system adapted to control the beams emitted from headlamps.

2. Description of the Related Art

Typical conventional vehicle headlamps are incapable of sufficiently irradiating road surfaces ahead of a vehicle when the vehicle is driven on mountain roads, around curves at intersections, and so forth, because the beam emitting directions are fixed.

In this connection, JP-A-6-72234 discloses a vehicle headlamp system adapted to detect a vehicle speed and a road configuration ahead of one's own vehicle, and to calculate a position that the vehicle is expected to reach after being driven for a predetermined time in accordance with the road configuration, with the calculated arriving position of the vehicle as a target position.

In the vehicle headlamp system of the above-described publication, however, there exists the following problem. Although the actual vehicle speed (the vehicle speed at a point of the present time) is taken into consideration when one's own vehicle position a predetermined time later is calculated, no consideration is given to variation in the vehicle speed owing to the road configuration ahead of the vehicle.

More specifically, when the traveling road ahead of the vehicle is a curved road, the vehicle speed tends to become lower than that on a straight road. Also, the vehicle speed on a sharply curved road tends to become lower than that on a moderately curved road. Consequently, when the arriving position of one's own vehicle is estimated with the actual vehicle speed as a reference, the actual arriving position of one's own vehicle may largely differ from the estimated value. Such an error in the arriving position of one's own vehicle makes it infeasible to sufficiently irradiate the road surface ahead of the vehicle.

SUMMARY OF THE INVENTION

An object of the present invention, made in view of the foregoing circumstances, is to provide a vehicle headlamp system for controlling beams from headlamps by accurately estimating the arriving position of one's own vehicle a predetermined time later, which arriving position is used as a target position for beam control.

In order to accomplish the above and other objects, the arriving position of one's own vehicle is estimated on the basis of an advisable vehicle speed corresponding to the radius of curvature of a traveling road ahead of a vehicle by calculating the radius of curvature thereof.

A vehicle headlamp system according to the invention comprises:

headlamps for emitting beams forward from a vehicle, and beam control means for controlling the beams emitted from said headlamps, road-configuration detection means for detecting a road configuration ahead of the vehicle; and means for estimating the arriving position of one's own vehicle a predetermined time later, wherein said beam control means performs said beam control with said arriving position of one's own vehicle as a target position, and wherein said means for estimating the arriving position of one's own vehicle calculates the radius of curvature of a traveling road ahead of the vehicle from the results detected by said road configuration detection means so as to estimate the arriving position of one's own vehicle on the basis of an advisable vehicle speed corresponding to the radius of curvature thus calculated.

The contents of the beam control performed by the 'beam control means' are not limited to specific ones, but may include any suitable contents for variable control over, for example, the direction of the beam emitted from each headlamp, the emission range of the beam emitted therefrom, and the emitted quantity of light, or a proper combination thereof.

The 'road configuration detection means' is not limited to specific contents for detection, but may be any suitable means such as a navigation unit and a CCD camera capable of detecting a road configuration ahead of a vehicle.

The 'advisable vehicle speed' is a vehicle speed at which the vehicle is driven in a curve safely and pleasantly, and is preset in accordance with the radius of curvature of the traveling road.

'On the basis of the advisable vehicle speed' means using the advisable vehicle speed as one of the parameters when the arriving position of one's own vehicle is estimated and, needless to say, the actual vehicle speed (i.e., vehicle speed at the present time), which is different than the advisable vehicle speed, may be used as one of the parameters.

As described above, the vehicle headlamp system is adapted to perform beam control with the arriving position of one's own vehicle the predetermine time later as the target position, which predetermined time is estimated by the means for estimating the arriving position of one's own vehicle. However, the means for estimating the arriving position of one's own vehicle is also adapted to calculate the radius of curvature of a traveling road ahead of the vehicle, from the results detected by the road configuration detection means, so as to estimate the arriving position of one's own vehicle on the basis of an advisable vehicle speed corresponding to the radius of curvature thus calculated. Therefore, the following operation/working effect is achievable.

More specifically, when the arriving position of one's own vehicle is estimated with only the actual vehicle speed as a reference, the actual arriving position of one's own vehicle may greatly differ from the value estimated in accordance with the road configuration ahead of the vehicle. However, provided the arriving position of one's own vehicle is estimated on the basis of the advisable vehicle speed corresponding to the calculated radius of curvature of the traveling road ahead of the vehicle, the arriving position of one's own vehicle can accurately be estimated by taking into consideration a variation in vehicle speed that is likely to occur in the near future.

In the vehicle headlamp system so arranged as to perform beam control over the headlamps according to the invention, there accurately can be estimated the arriving position of one's own vehicle the predetermined time later, which is the target position of beam control, whereby the road surface ahead of the vehicle is sufficiently irradiated.

The 'predetermined time' is not specifically limited, but is preferably set within the range of values from 1.5 to 3.5 seconds and, more preferably, is set within the range of values from 2 to 3 seconds (e.g., 2.5 seconds) in order to sufficiently irradiate the road surface ahead of the vehicle.

The 'predetermined time' may be set at a fixed value, and may also be subjected to increase/decrease correction according to the difference between the advisable vehicle speed and the actual vehicle speed. With the adoption of the latter, the estimated accuracy of the arriving position of one's own vehicle can be prevented from being reduced when the advisable vehicle speed is not observed on the traveling road ahead of the vehicle.

The arriving position of one's own vehicle is shifted to a position farther than the estimated position as the actual vehicle speed grows greater than the advisable vehicle speed. Then, an increase/decrease correction is preferably made such that the predetermined time is set shorter as the actual vehicle speed becomes greater than the advisable vehicle speed.

The turning radius of the actual turning travel line may often have different values when the traveling road ahead of the vehicle is a rightward-turning road, and where the traveling road is a leftward-turning road. Therefore, the arriving position of one's own vehicle is preferably estimated by setting the predetermined time at different values depending on whether the road ahead of the vehicle is the rightward-turning or the leftward-turning road.

More specifically, the predetermined time on the rightward turning road may be set at a value greater than the value set on the leftward turning road in the keep-to-the-left traffic environment. Similarly, the predetermined time on the leftward turning road may be set at a value greater than the value set on the rightward turning road in the keep-to-the-right traffic environment.

BRIEF DESCRIPTION OF THE DRAWINGS

The above and other objects and advantages of the present invention will become more apparent by describing in detail preferred exemplary embodiments thereof with reference to the accompanying drawings, wherein like reference numerals designate like or corresponding parts throughout the several views, and wherein:

FIGS. 5(a) to 5(c) are plan views of roads for use in showing a first specific example of a corresponding-turning-angle mode according to the first embodiment of the invention;

FIGS. 6(a) to 6(c) are plan views of roads for use in showing a second specific example of a corresponding-turning-angle mode according to the first embodiment of the invention;

FIGS. 8(a) and 8(b) are plan views showing the results of first simulations conducted to examine the target position of beam control in the road-configuration control mode in order to learn how many seconds from a point of the present time are optimal for setting the arriving time of one's own vehicle;

FIGS. 9(a) and 9(b) are plan views showing the results of second simulations;

FIGS. 10(a) and 10(b) are plan views showing the results of third simulations;

FIGS. 11(a) and 11(b) are plan views showing the results of fourth simulations;

FIGS. 12(a) and 12(b) are plan views showing the results of fifth simulations;

FIGS. 13(a) and 13(b) are plan views showing the results of sixth simulations;

FIGS. 14(a) and 14(b) are plan views showing the results of seventh simulations;

FIGS. 15(a) and 15(b) are plan views showing the results of eighth simulations.

DETAILED DESCRIPTION OF THE PREFERRED EMBODIMENTS

An embodiment of the present invention will now be described with reference to the drawings.

Figure 1:
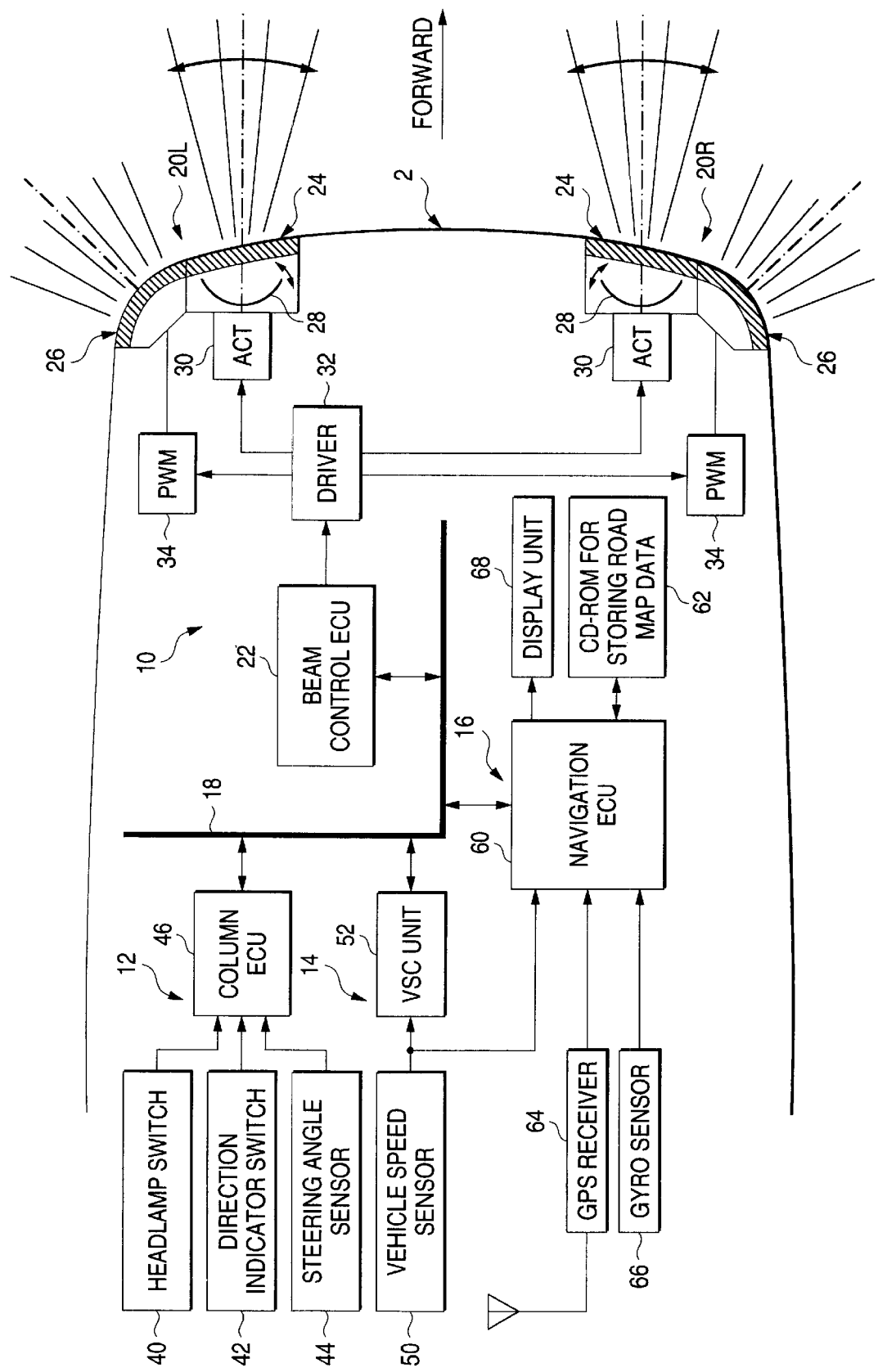
FIG. 1 is an overall block diagram showing a vehicle headlamp system according to a first embodiment of the invention.

FIG. 1 is an overall block diagram showing a vehicle headlamp system according to this embodiment of the invention.

As shown in FIG. 1, the vehicle headlamp system comprises a headlamp unit 10, a column unit 12, a VSC (Vehicle Stability Control) unit 14, and a navigation unit 16 (road configuration detection means), wherein these units are connected together via an interior LAN 18.

The headlamp unit 10 includes a pair of bilateral headlamps 20L and 20R, and a beam control ECU 22 (beam controlling means) for controlling beams from these bilateral headlamps 20L and 20R.

Each of the bilateral headlamps 20L and 20R is formed of a headlamp 24 and a cornering lamp 26. The headlamp 24 is provided in the front end portion of a vehicle 2. The cornering lamp 26 is positioned adjacent to the headlamp 24, and on the exterior in the width direction of the vehicle 2.

Figure 2:
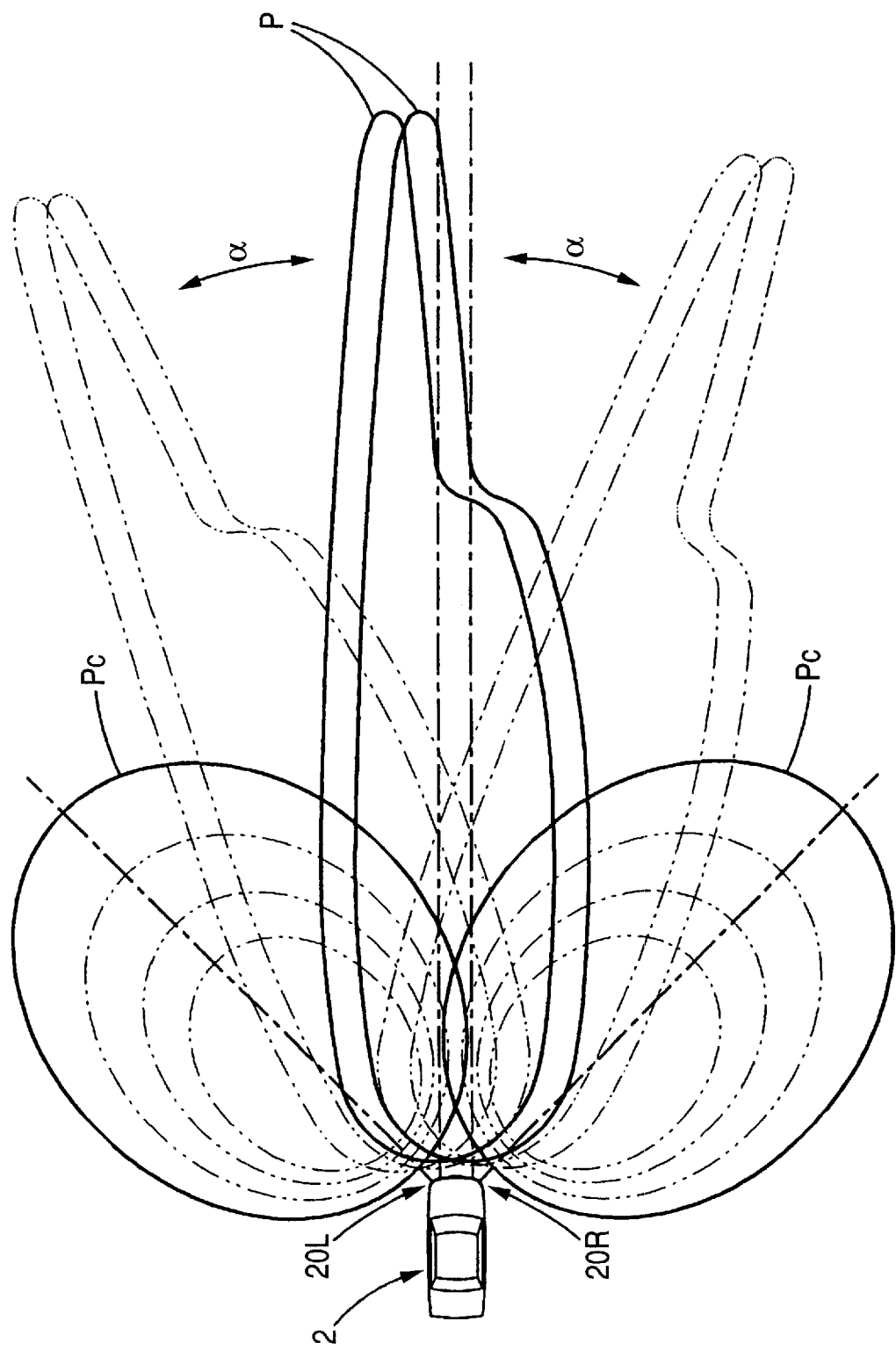
FIG. 2 is a plan view of luminous intensity distributions of the beams emitted from headlamps according to the first embodiment of the invention.

Each headlamp 24 carries out forward, from the vehicle 2, beam emission with a luminous intensity distribution P (low-beam luminous intensity distribution), wherein the beam emission is made by way of the light reflected from a bilaterally-tiltable reflector 28. As shown in FIG. 2, each beam emitting direction can be varied bilaterally up to the position of the luminous intensity distribution P—shown by a chain double-dashed line—that is a predetermined angle $\alpha$(e.g., $\alpha=20°$) around the head-on direction of the luminous intensity distribution P shown by a solid line, which corresponds to the head-on direction of the vehicle. In order to realize the above-described arrangement, each of the bilaterally-tiltable reflectors 28 is tilted when an actuator (ACT) 30 is driven. The actuator 30 is driven under the control of the beam control ECU 22 via a driver 32.

On the other hand, the beam emitting direction of each cornering lamp 26 is fixed at a predetermined angle so as to form a luminous intensity distribution Pc as shown in FIG. 2. For example, the beam emitting direction can be fixed at an angle of 45° from head-on direction of the vehicle. Further, the cornering lamp 26 is connected to the beam control ECU 22 via a dimmer circuit (PWM) 34 and the driver 32, whereby the beam intensity of the cornering lamp 26 can be made variable. More specifically, as shown in FIG. 2, though each luminous intensity distribution Pc becomes large—as shown by the solid line—when the beam intensity is maximized, the luminous intensity distribution Pc gradually becomes smaller in size—as shown by the chain double-dashed lines—when the beam intensity is decreased by dimming.

The column unit 12 is provided in a steering column and includes a headlamp switch 40, a direction indicator switch 42, a steering angle sensor 44 (turning angle detection means), and a column ECU 46. The headlamp switch 40 is used for switching on and off the headlamps 24, and for switching beams (high and low beams). The direction indicator switch 42 is a switch for switching on and off the bilateral direction indicators. The steering angle sensor 44 is used for detecting the steering angle (turning angle) of the vehicle 2, and detects steering angle based on the rotational angle of a steering wheel. Further, the column ECU 46 is used for collecting signals from the headlamp switch 40, the direction indicator switch 42, and the steering angle sensor 44. After collecting signals, the column ECU 46 sends the signals to the interior LAN 18.

The VSC unit 14 includes a vehicle speed sensor 50, a yaw rate sensor (not shown), and a VSC-ECU 52. The VSC-ECU 52 is for avoiding spin and for supporting safety in travel while the vehicle 2 is being driven around a curve, wherein the VSC-ECU receives the signal detected by each the yaw rate sensor and the vehicle speed sensor 50. Alternatively, the signal detected by the steering angle sensor 44 may be used instead of what is detected by the yaw rate sensor.

The navigation unit 16 includes a navigation ECU 60, a CD-ROM 62 for storing road map data, a GPS receiver 64, a gyro sensor (direction sensor) 66, and a display unit 68. The ECU 60—of the navigation unit 16—receives data from each of the sensors incorporated in the navigation unit 16, and receives the vehicle speed data obtained from the vehicle speed sensor 50 of the VSC unit 14. Moreover, the navigation ECU 60 also receives data on the direction indicator switch 42, and data from the steering angle sensor 44, wherein these data are received from the column ECU 46 via the interior LAN. The present position of one's own vehicle, a turning radius, an arrival position a predetermined time later, and the like, are obtained by processing data in the ECU 60 and are then output to the interior LAN 18.

The beam control ECU 22 (of the headlamp unit 10) collects necessary information—via the interior LAN 18—from the column unit 12, the VSC unit 14, and the navigation unit 16, so as to control beams from the bilateral headlamps 20L and 20R in a control mode fit for the travel conditions of the vehicle 2.

The control mode includes a road-configuration-corresponding mode and a corresponding-turning-angle mode. In the road-configuration-corresponding mode, beam control is performed on the basis of forward road configuration data that is obtainable from the navigation unit 16. In the corresponding-turning-angle mode, beam control is performed on the basis of steering angle data (turning angle data) from the steering angle sensor 44.

The road-configuration-corresponding mode further includes a road-configuration control mode and an intersection-control mode. In the road-configuration control mode, beam emission is carried out such that it is fit for traveling in accordance with the road configuration. In the intersection-control mode, beam emission is carried out such that it is fit for traveling in a curve at intersections.

When the vehicle 2 is driven in accordance with the configuration of a traveling road, in the road-configuration control mode, beam control is performed with a position to be reached by the vehicle 2 a predetermined time later (e.g., 2.5 seconds later) as a target position. The beam control is carried out by tilting the reflectors 28 bilaterally from the head-on direction of the vehicle 2 so as to adequately very the beam emitting direction.

Figure 3:
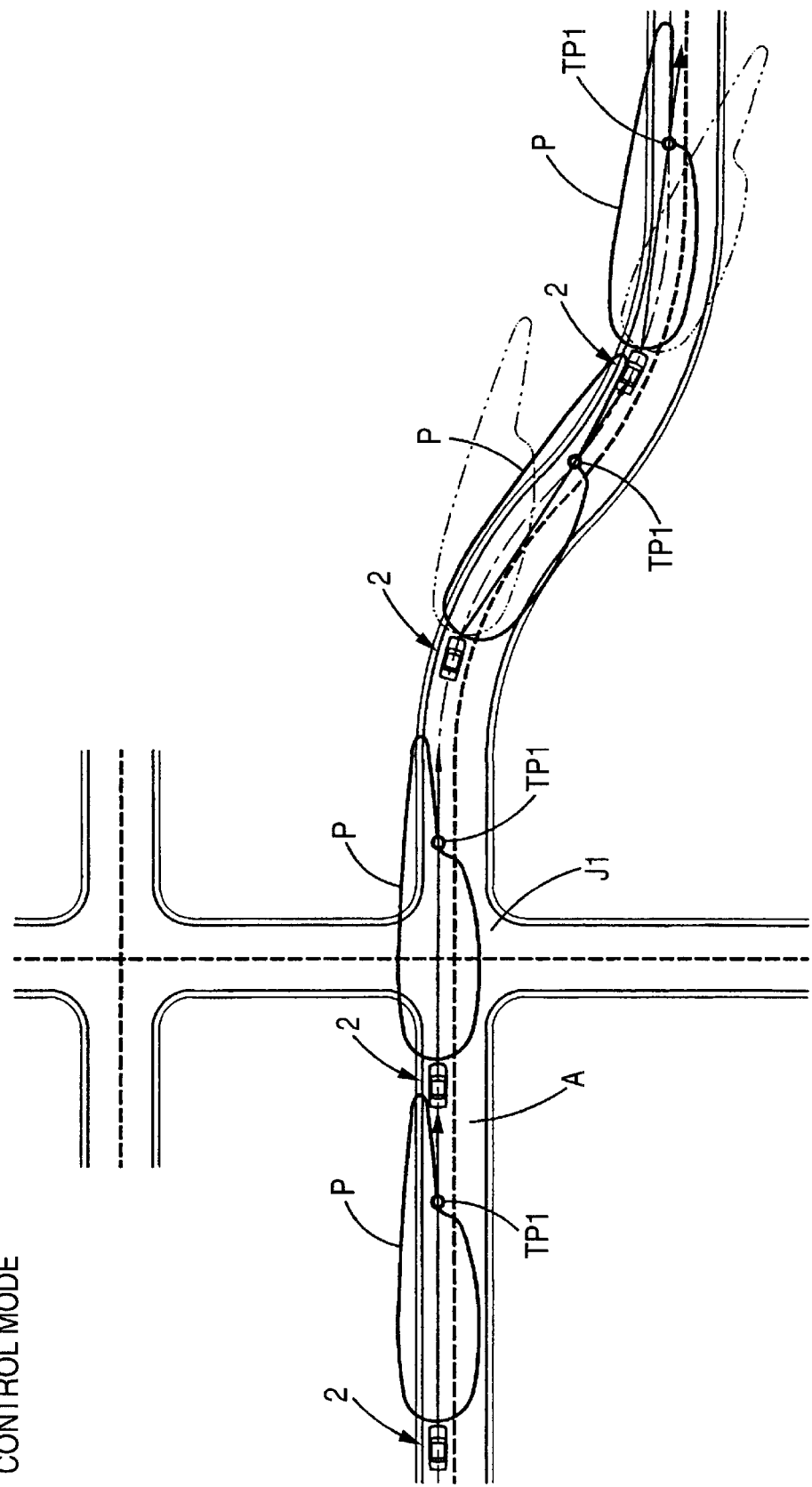
FIG. 3 is a plan view of roads for use in showing a specific example of a road configuration control mode according to the first embodiment of the invention.

FIG. 3 is a plan view of a road for showing a specific example of the road-configuration control mode.

In this specific example, it is assumed that a vehicle 2, running on a straight traveling road A at 50 km per hour, starts running on an S-shaped curved road after straightly running without turning left or right at the intersection J1.

In FIG. 3, TP1 ahead of the vehicle 2 designates a position (i.e., a target position under the beam control) to be reached by the vehicle 2 at a time 2.5 seconds later. Initially, a luminous intensity distribution P is directed ahead of the vehicle 2 because the target position TP1 exists directly ahead of the vehicle 2 on the straight road. Then, the luminous intensity distribution P is deviated to the left or right from the head-on direction of the vehicle 2 on the curved road. That is, the luminous intensity distribution P is deviated bilaterally from the head-on direction of the vehicle 2, as shown by a chain double-dashed line. The luminous intensity distribution P is a synthetic luminous intensity distribution resulting from the pair of bilateral headlamps 24.

On the other hand, in the intersection-control mode, when the vehicle 2 is clearly turned at an intersection ahead, visibility in the travel direction of the vehicle 2 is enhanced by directing beam emission toward the turning direction before the vehicle 2 arrives at the intersection. Beam control, in this intersection-control mode, is performed with a position to be reached by the vehicle 2 a predetermined time later (e.g., 2.5 seconds later) as a target position. When it is judged that the vehicle 2 will be turned at an intersection, beam control is performed at a point of time when the vehicle 2 approaches within a certain distance of the intersection. The beam control is basically performed by bilaterally tilting the reflectors 28 from the head-on direction of the vehicle 2 in order to direct beam emission toward the turning direction. When the beam emission directed toward the target position cannot be satisfactorily carried out only by tilting the head lamps 24, however, the cornering lamp 26—positioned on the turning side of the vehicle 2—is lighted. At this time, the beam intensity of the cornering lamp 26 is gradually increased as the difference between the maximum tilting angle α of the reflector 28 and the angle directed to the target position increases.

Figure 4:
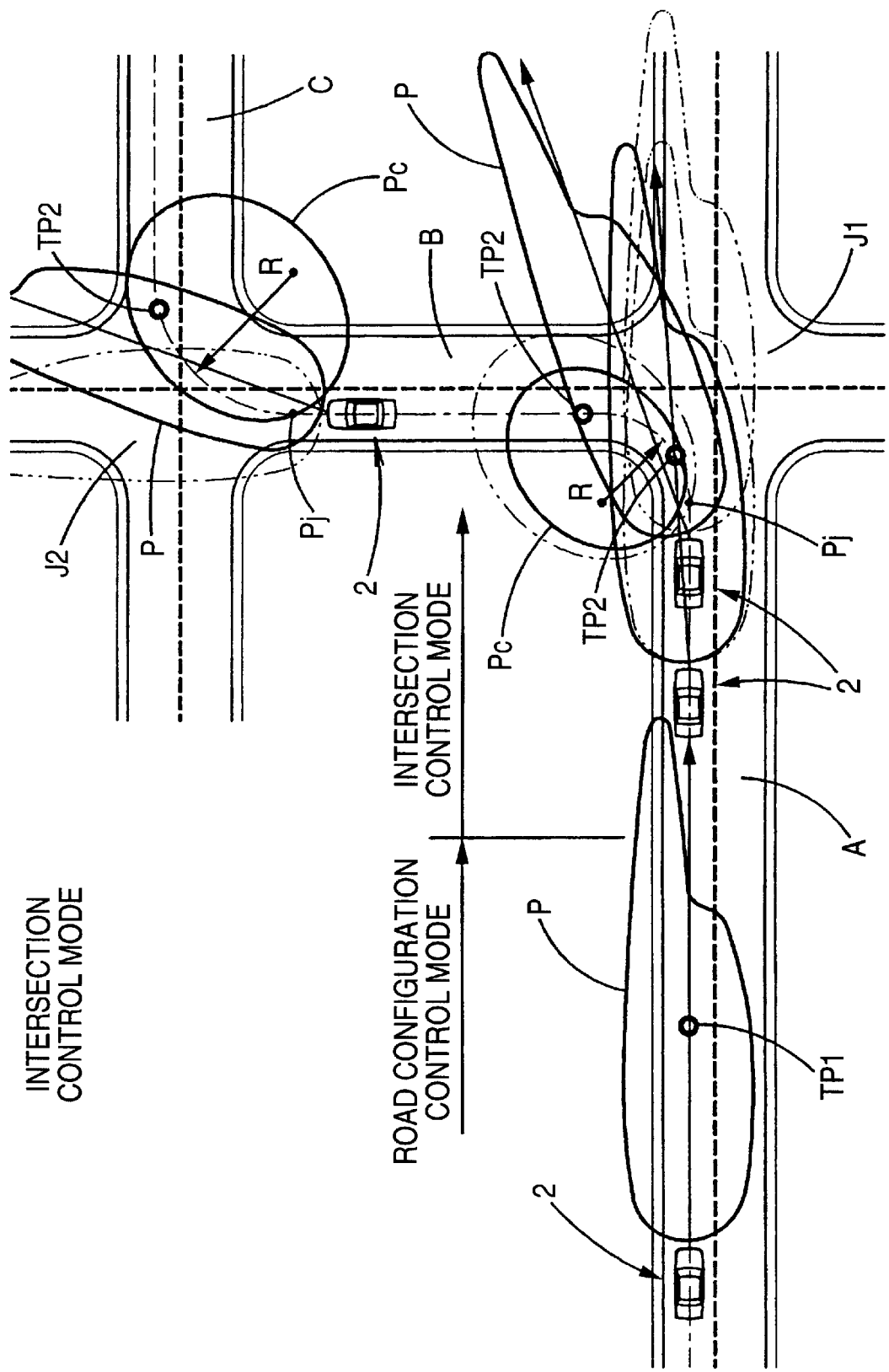
FIG. 4 is a plan view of roads for use in showing a specific example of an intersection control mode according to the first embodiment of the invention.

FIG. 4 is a plan view of a road for showing a specific example of the intersection-control mode.

In this specific example, it is assumed that the vehicle 2—running on the traveling road A at 30 km per hour—turns left at the next intersection J1, enters a traveling road B, and then turns right at the next intersection J2 thereby a traveling road C.

As shown in FIG. 4, while the vehicle 2 is in a position that is considerably separated on this side (left side) from the intersection J1 of the traveling road A, beam control is performed in the road-configuration control mode. However, the road-configuration control mode is switched to the intersection-control mode when the direction indicator is actuated as the vehicle 2 approaches to within a certain distance of the intersection J1.

In FIG. 4, a point TP2 shown ahead of the vehicle 2 designates a position to be reached by the vehicle 2.5 seconds later (i.e., a target position under the beam control) in the intersection-control mode. Initially, the luminous intensity distribution P is directed ahead of the vehicle 2, because the target position TP2 exists directly ahead of the vehicle 2, when the vehicle 2 is in the position on this side (left side) of, and is separated to a certain degree from, the intersection J1. As the target position TP2 becomes positioned on a turn-left travel line (shown by a chain line in FIG. 4) within the intersection J1, as the vehicle 2 approaches the intersection J1, the luminous intensity distribution P is also deviated to the left from the head-on direction of the vehicle 2, as shown by a chain double-dashed line. That is, the target position TP2 is deviated to the left along the turn-left travel line within the intersection J1, whereby the luminous intensity distribution P is also changed to the left direction. When the direction of the target position TP2 exceeds the maximum tilting angle α of the reflector 28, however, the direction of the luminous intensity distribution P cannot follow the target position TP2. Therefore, the left-side cornering lamp 26 is lighted to form a luminous intensity distribution Pc, thereby irradiating an area in the leftward direction. Although the beam intensity of this cornering lamp 26 is initially low, the beam intensity is gradually increased as the difference between the maximum tilting angle α (of the reflector 28) and the angle directed to a target position T2 increases.

Beam control is also performed when the vehicle 2 is turned to the right at the next intersection J2. However, because the turning radius R of a turn-right travel line—within the intersection J2—is larger than a radius when turning left, the beam emission directed toward the target position T2 becomes insufficient if the beam intensity of the cornering lamp 26 is only gradually increased as the difference between the maximum tilting angle α of the reflector 28 and the angle directed to the target position T2 increases. Therefore, in this situation, the beam intensity is set at a maximum value immediately after the cornering lamp 26 is lighted.

When the vehicle 2 actually turns within the intersection, after having reached the intersection J1 or J2, the beam control is not performed in the intersection-control mode, but is performed in the corresponding-turning-angle mode.

The corresponding-turning-angle mode is a control mode to be utilized on the assumption that the vehicle 2 is actually turning; however, this mode is also used for complementing the road-configuration control mode and the intersection-control mode. In the corresponding-turning-angle mode, the reflectors 28 are turned in the turning direction of the vehicle 2 according to the steering angle, when the steering operation is performed. Simultaneously, the cornering lamp 26 that is positioned on the turning side of the vehicle 2, is lighted. At this time, the tilting angles of the reflectors 28, and the beam intensity of the cornering lamp 26, are gradually increased as the steering angle increases.

When the intersection-control mode is switched to the corresponding-turning-angle mode, beam emission control is taken over by the corresponding-turning-angle mode in order to prevent beam emission from being discontinuous, i.e., in order to prevent the luminous intensity distribution P of the headlamp 24 and the luminous intensity distribution Pc of the cornering lamp 26 from being abruptly varied.

FIGS. 5 and 6 are plan views of roads for showing specific examples of the corresponding-turning-angle mode.

In FIG. 5 it is assumed that the vehicle 2 is turned to the left at the intersection J1, and in FIG. 6 it is assumed that the vehicle 2 is turned to the right at the intersection J2.

As shown in these drawings, the conditions of beam emission in the intersection-control mode are followed until the steering angle is maximized. The steering angle is maximized through the steering operation in a positive direction when the vehicle 2 is turned at the intersections J1 and J2, whereby the tilting angle of the reflector 28, and the beam intensity of the cornering lamp 26, are maintained at the maximum value. That is, both the bilateral deflection angles of the luminous intensity distribution P, and also the size of the luminous intensity distribution Pc, are maximized. When the steering angle is decreased through a steering operation in a negative direction, the tilting angle of the reflector 28, and the beam intensity of the cornering lamp 26, are gradually decreased.

Figure 7:
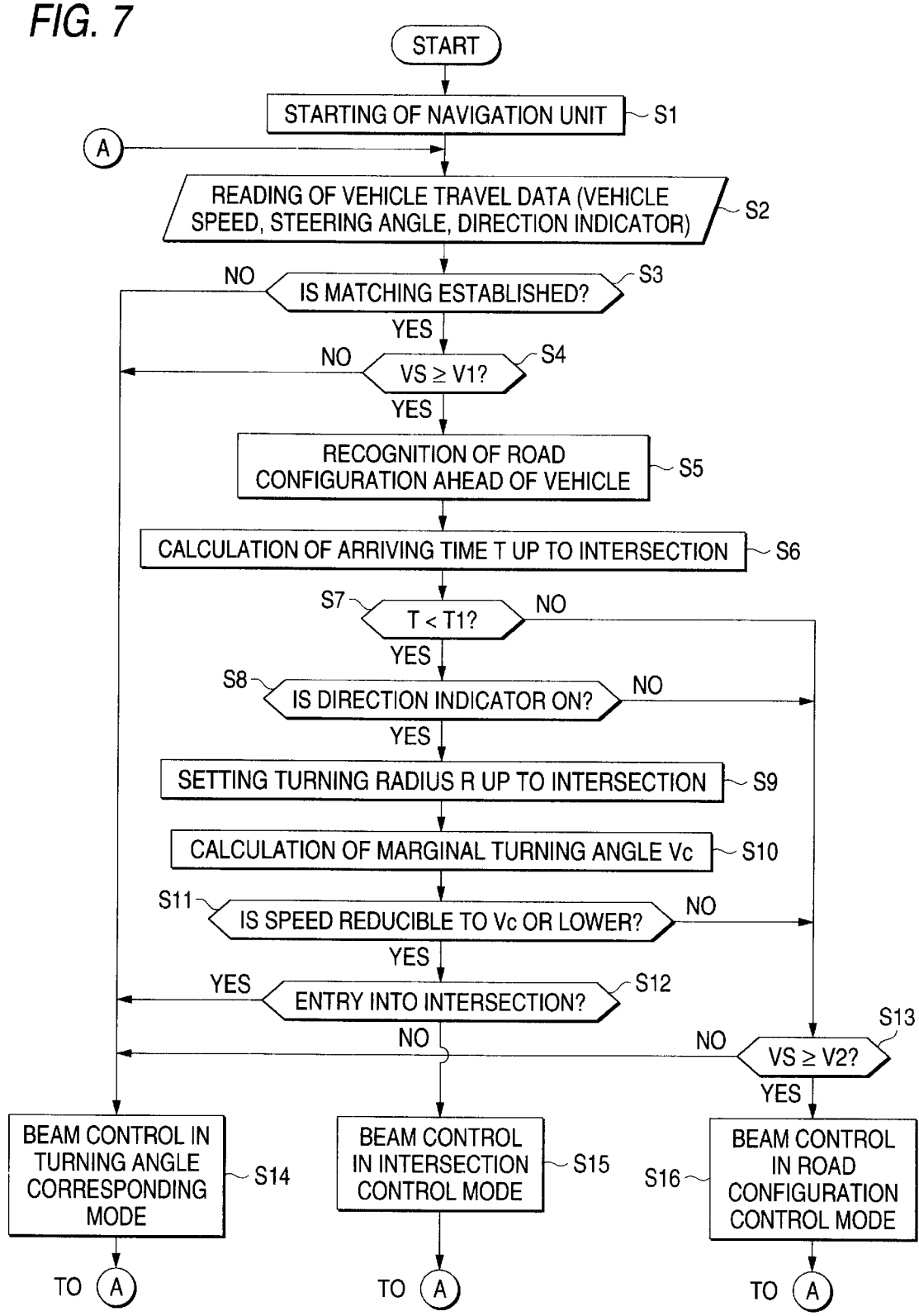
FIG. 7 is a flowchart showing the contents of beam control performed according to the first embodiment of the invention.

The contents of the beam control, performed in the vehicle headlamp system, according to this embodiment of the invention will now be described according to the flow-chart of FIG. 7.

First, the navigation unit 16 is started and road map data is read from the CD-ROM 62 so as to store road map data in the navigation ECU 60 (S1). Then, vehicle travel data—such as, for example, vehicle speed data from the vehicle speed sensor 50, steering data from the steering angle sensor 44, and data on the operating condition of the direction indicator from the direction indicator switch 42—are read (S2).

Further, map matching is conducted in the navigation ECU 60 on the basis of position data from the GPS receiver 64, direction data from the gyro sensor 66, and the road map data (S3).

When map matching is not established, i.e. the present position of the vehicle 2 is unrecognizable, then the beam control ECU 22 performs the beam control over the bilateral headlamps 20L and 20R in the corresponding-turning-angle mode on the assumption that the vehicle 2 is not on the road (S14).

When map matching is established, on the other hand, the beam control ECU 22 assumes that the vehicle 2 is present on the road, and compares the actual vehicle speed VS (vehicle speed at the present time) with a primary set vehicle speed VI (predetermined speed; V1=20 km/hr, for example) (S4). If VS<VI, beam control is performed in the corresponding-turning-angle mode (S14). In this case, the beam control is not performed in the road-configuration-corresponding mode (i.e., either the road-configuration control mode, or the intersection-control mode) because lane or course changing is often made during travel at a low vehicle speed thereby making it difficult to estimate the course in the navigation unit 16. If VS<V1, on the other hand, the recognition of the road configuration ahead of the vehicle 2, needed for beam control, is sought in the road-configuration-corresponding mode (S5). In other words, a determination of the present position of the vehicle 2, the kind of the road on which the vehicle 2 is running, the number of lanes, positions of intersections (nodes) existing on the traveling road ahead, the number of intersecting roads (links) at the respective intersections, and the like, is carried out in the navigation unit 16.

The time T required for the vehicle 2 to reach the next intersection ahead on the traveling road, from its present position, is calculated (S6). The calculation is based on data on the road configuration ahead of the vehicle 2, and data on the actual vehicle speed VS. Then, a decision is made on whether or not the arriving time T is less than a set time T1. For example, T1 is set to an adequate value within the range of T1=2.5–3.5 seconds) (S7). The reason for setting T1 at 2.5 to 3.5 seconds in this case is that the operation of the direction indicator would be completed within that range of time so as to start the operation of reducing the speed when the course is changed at the intersection.

If the arriving time T is such that T≧T1, beam control is performed in the road-configuration control mode because it is reasonable to expect that the vehicle 2 will keep running on the road in accordance with the road configuration for the, time being (S16). When the actual vehicle speed VS is less than a secondary set speed V2 (e.g., V2=40 km/hr) which is higher than the primary set vehicle speed V1, (i.e., NO at S13), then beam control is performed in the corresponding-turning-angle mode as the possibility of changing the line and the like is comparatively high (S14).

If the arriving time T is such that T<T1, on the other hand, a check is made to determine whether or not the direction indicator is in operation (S8). When the direction indicator switch 42 is held ON, the turning radius R is set at the intersection on the assumption that the course is changed at the next intersection (S8). When the direction indicator switch 42 is held OFF, the actual vehicle speed VS is checked, and if VS≧V2, beam control is performed in the road-configuration control mode (S16), whereas if VS<V2, beam control is performed in the corresponding-turning-angle mode (S14). The reason for using the road-configuration control mode, when VS≧V2, is that as long as the direction indicator remains unactuated with the vehicle speed maintained at a certain level or higher, it is unlikely that the vehicle will change course at the next intersection.

As shown in Table 1, the turning radius R is set by reading a value, that is set according to the kinds of traveling and intersecting roads, from a numerical value table for use in turning right (Table 1—1) and a numerical value table for use in turning left (Table 1-2).

TABLE 1-1

Turning Radius R(m)
when Turning Right at Rectangular Intersection:

| | Intersecting Road | | |
|---|---|---|---|
| | 4-lane Highway | 2-lane Highway | Prefectural Road, etc. |
| Traveling Road | | | |
| 4-lane Highway | 16 | 11 | 7 |
| 2-lane Highway | 14 | 9 | 5 |
| Prefectural Road, etc. | 12 | 6 | 5 |

TABLE 1-2

Turning Radius R(m)
when Turning Left at Rectangular Intersection:

| | Intersecting Road | | |
|---|---|---|---|
| | 4-lane Highway | 2-lane Highway | Prefectural Road, etc. |
| Traveling Road | | | |
| 4-lane Highway | 16 | 11 | 7 |
| 2-lane Highway | 14 | 9 | 5 |
| Prefectural Road, etc. | 12 | 6 | 5 |

As is obvious from Table 1, the turning radius R at the time of turning right is often set at a value greater than the value set at the time of turning left, in the keep-to-the-left traffic environment. When the intersection is not a rectangular one, the value read from the numerical value table is subjected to correction so as to set the turning radius R. More specifically, the turning radius R is increased when the direction of travel at the intersection makes an obtuse angle with the traveling road. Similarly, the turning radius R is decreased when the direction of travel at the intersection makes an acute angle with the traveling road.

Thus, the turning radius R is set before calculating the marginal turning speed Vc at which the vehicle 2 is actually capable of traveling in a curve with the turning radius R (S10). The calculation of the marginal turning speed Vc is carried out by using the following road linear design theory adopted in the field of traffic engineering:

$$R = \frac{V^2}{127(i+f)}$$

where i=one-sided gradient; and f=side slip coefficient in the road linear design theory. If i=0 and f=0.25, the relation between the turning radius R and the marginal turning speed Vc is as shown in Table 2.

TABLE 2

Calculated values (km/hr)
of Marginal Turning Speed Vc in Traffic Engineering

| Turning Radius R | 5 | 6 | 7 | 8 |
|---|---|---|---|---|
| Marginal Turning Speed | 12.59 | 13.80 | 14.91 | 15.93 |
| Turning Radius R | 9 | 10 | 12.5 | 15 |
| Marginal Turning Speed | 16.90 | 17.81 | 19.92 | 21.82 |

Further, a check is made to determine whether or not the actual vehicle speed VS is reducible to the marginal turning speed Vc before the vehicle 2 reaches the intersection (S11). A discriminant using: the distance between the vehicle 2 and the intersection; the reduction degree calculated from the actual vehicle speed VS; and the frictional coefficient of the road surface, is employed for carrying out the check. Usually when the distance up to the intersection is decided, a reference position on the intersection side is preferably set at the entry point. The entry point is the position shown by Pj in FIGS. 4 to 6, whereas the reference position is a position whereat the steering operation is started. However, the reference position would not deviate so much from the entry point Pj even if the reference position is set at a position resulting from deducting a distance equivalent to the turning radius R from the center of the intersection.

When the actual vehicle speed VS is not reducible to the marginal turning speed Vc or lower (i.e., NO at S11), the beam control ECU 22 assumes that the direction indicator is mistakenly actuated, or that simply the lane is about to be changed, and performs beam control in the road-configuration control mode (S14), thereby preventing beam emission from being turned in the direction in which the direction indicator is actuated.

On the other hand, when the actual vehicle speed VS is reducible to the marginal turning speed Vc or lower (i.e., YES at S11), a decision is made on whether or not the vehicle has entered the intersection (S12). This decision is made on whether or not the arriving time T up to the intersection has become such that T≦0. When the vehicle has not entered the intersection yet, beam control is performed in the intersection control mode (S15), and where the vehicle has entered the intersection, beam control is performed in the corresponding-turning-angle mode (S14).

According to this embodiment of the invention, beam control in the road-configuration control mode is performed with the arriving position of the vehicle at a predetermined time t as a target position TP1. The choice of a predetermined time t of 2.5 seconds is shown by way of example, and this is because it has become clear from the results of simulations, which will be described later, that the target position TP1 where the road surface ahead of the vehicle can be irradiated most efficiently with the luminous intensity distribution P—formed by the headlamp 24 in the travel condition of the vehicle in accordance with the road configuration—is the position reached by one's own vehicle 2.5 seconds later.

When the arriving position of one's own vehicle 2.5 seconds later is estimated only with reference to the vehicle speed (actual vehicle speed VS) at the present time, the actual arriving position of one's own vehicle may greatly differ depending on the road configuration ahead of the vehicle, whereby the target position TP1 is deviated from the predetermined position.

In the navigation ECU 60, according to this embodiment of the invention, a curvature radius Ro of the traveling road ahead of the vehicle is calculated according to the detected results of the road configuration ahead of the vehicle, and the arriving position of one's own vehicle 2.5 seconds later is estimated on the basis of an advisable vehicle speed Vi corresponding to the curvature radius Ro thus calculated. Consequently, the arriving position of one's own vehicle 2.5 seconds later is accurately estimated in consideration of vehicle speed variation that can occur in the near future, so that the road surface ahead of the vehicle is sufficiently radiated.

The advisable vehicle speed Vi ca be calculated by applying the radius of curvature Ro in place of the turning radius R, and by applying the advisable vehicle speed Vi in place of the marginal turning speed Vc to the road liner design theory, whereby a numerical value table showing the relation between the advisable vehicle speed Vi and the radius of curvature Ro can be obtained as shown in Table 3.

TABLE 3

| Advisable vehicle speed Vi (km/hr) | Side slip f | Curvature radius Ro (m) | | |
|---|---|---|---|---|
| | | one-sided gradient i = 6% | one-sided gradient i = 8% | one-sided gradient i = 10% |
| 120 | 0.10 | 710 | 630 | 566 |
| 100 | 0.11 | 463 | 414 | 375 |
| 80 | 0.12 | 280 | 252 | 299 |
| 60 | 0.13 | 149 | 135 | 123 |
| 50 | 0.14 | 99 | 89 | 82 |
| 40 | 0.15 | 60 | 55 | 50 |
| 30 | 0.25 | 34 | 31 | 28 |
| 20 | 0.25 | 15 | 14 | 13 |

Although the advisable vehicle speed Vi obtained from the numerical value table is a marginal turning speed corresponding to the radius of curvature Ro (i.e., a maximum vehicle speed at which the vehicle is driven in a curve safely and pleasantly), actually it may be expected that the vehicle will not be driven only at the advisable vehicle speed Vi or lower, but also at the advisable vehicle speed Vi or higher. When one's own vehicle is turned at a speed different from the advisable vehicle speed Vi, the arriving position of one's own vehicle may differ from an estimated value, and the target position TP1 may deviate from the predetermined position.

Therefore, according to this embodiment of the invention, the predetermined time t is subjected to increase/decrease correction based on the difference between the advisable vehicle speed Vi and the actual vehicle speed VS. Even though the advisable vehicle speed Vi is not observed, there is prevented a decrease in the accuracy of estimation of the arriving position of one's own vehicle. The arriving position of one's own vehicle is shifted to a position farther than the estimated position as the actual vehicle speed VS grows greater than the advisable vehicle speed Vi. That is, the increase/decrease correction is made such that the predetermined time t is set shorter than 2.5 seconds as the actual vehicle speed VS becomes greater than the advisable vehicle speed Vi.

Incidentally, the radius of curvature Ro, used when the advisable vehicle speed Vi is set, is obtained as a radius of part of the curve of the traveling road ahead of the vehicle through the calculation of the curve thereof with the present position of the vehicle as a reference. The calculation of the curve of the road is made by applying the position data (including latitude and longitude) concerning a node included in the traveling road to a spline curve and the like. As a section to be calculated, a node in two places ahead of the present position of the vehicle, and a node passed thereby, are included therein. At this time, it is preferred to use node data ranging from 200 m ahead or approximately 5 seconds ahead.

Although the radius of curvature Ro thus obtained is intended for the curve of one road representing the traveling road, the traveling road actually has width, and as shown in FIG. 3, for example, the curve of the road forms the center line of the traveling road having two traffic lanes (one lane on one side). Therefore, according to this embodiment of the invention, in the keep-to-the-left traffic environment the turning radius R—f the turning travel line of the vehicle 2—has a value greater than the radius of curvature Ro on a rightward turning road, whereas the turning radius R thereof has a value smaller than the radius of curvature Ro on a leftward-turning road. According to this embodiment of the invention, correction is made to shorten the predetermined time t by 2.5 seconds on the leftward turning road, whereas correction is made to lengthen the predetermined time t by 2.5 seconds on the rightward turning road.

A decision is made on whether the traveling road is a rightward or leftward turning road according to the fact that the product of the direction vector—detected by the gyro sensor—in the travel direction of the vehicle then, and the calculated direction vector at a point on the curve of the road, is either positive or negative.

FIGS. 8–15 are plan views showing the results of simulations conducted to examine the target position TP1 of beam control, in the road-configuration control mode, in order to learn how many seconds from the present time are optimal for setting the arriving time of one's own vehicle.

These drawings all refer to a case where the vehicle 2 is running on an S-curved road after having traveled on a straight road. FIGS. 8–11 include cases where the turning radius R, of the turning travel line (shown by a chain line), is such that R=30 m. FIGS. 12–15 include cases where the turning radius R, of the turning travel line (shown by a chain line), is such that R=60 m.

FIGS. 8 and 9 show the conditions of beam emission resulting from the presence or absence of beam control, and show the difference of the target position TP1 of beam control when the vehicle is driven along the turning travel line with a turning radius R of 30 m at an advisable vehicle speed of 30 km/hr: FIG. 8(a) refers to the absence of beam control (the beam emitting direction is fixed to the forward direction of the vehicle); and FIG. 8(b), FIGS. 9(a) and (b) respectively refer to cases where the emitting positions are set at arrival positions of one's own vehicle 1.5, 2.5, and 3.5, seconds later.

As is clear from these drawings, most of the luminous intensity distribution P formed by beam emission is seen to go off the traveling road on the curved road in the absence of beam control. On the other hand, the amount—of luminous intensity distribution P—that is deviated from the traveling road tends to decrease even on the curved road when the emitting positions are set at the arriving positions of one's own vehicle 1.5, 2.5, and 3.5, seconds later.

Because is possible to sufficiently look over a road surface ahead in proportion to not only greater emission efficiency with the least deviated amount of luminous intensity distribution P, but also better road irradiation efficiency, travel safety can be improved. Evaluation from a comparison of the road irradiation efficiency proves:

2.5 seconds later≈3.5 seconds later>1.5 seconds later>>without beam control.

FIGS. 10 and 11 show the conditions of beam emission when the vehicle is driven along the turning travel line with a turning radius R of 30 m, and at 1.5 times the advisable vehicle speed of 45 km/hr. These figures are similar to FIGS. 8 and 9.

Evaluation from a comparison of the road irradiation efficiency in this case proves:

2.5 seconds later>1.5 seconds later>3.5 seconds later>>without beam control.

FIGS. 12 and 13 show the conditions of beam emission when the vehicle is driven along the turning travel line with a turning radius R of 60 m, and at an advisable vehicle speed of 40 km/hr. These figures are similar to FIGS. 8 and 9.

Evaluation from a comparison of the road irradiation efficiency in this case proves:

2.5 seconds later≈3.5 seconds later>1.5 seconds later>>without beam control.

FIGS. 14 and 15 show the conditions of beam emission when the vehicle is driven along the turning travel line with a turning radius R of 60 m, and at 1.5 times the advisable vehicle speed of 60 km/hr. These figures are similar to FIGS. 8 and 9.

Evaluation from a comparison of the road irradiation efficiency in this case proves:

2.5 seconds later≈1.5 seconds later>3.5 seconds later>>without beam control.

The results of the simulations have proved it is optimal to set the target position TP1, of beam control in the road-configuration control mode, at the arriving position of one's own vehicle 2 to 3 seconds later, especially about 2.5 seconds later from the present time. When the actual vehicle speed VS of the vehicle 2 is higher than the advisable vehicle speed Vi, the arriving time is preferably set at a value shorter than 2.5.

Figure 16:
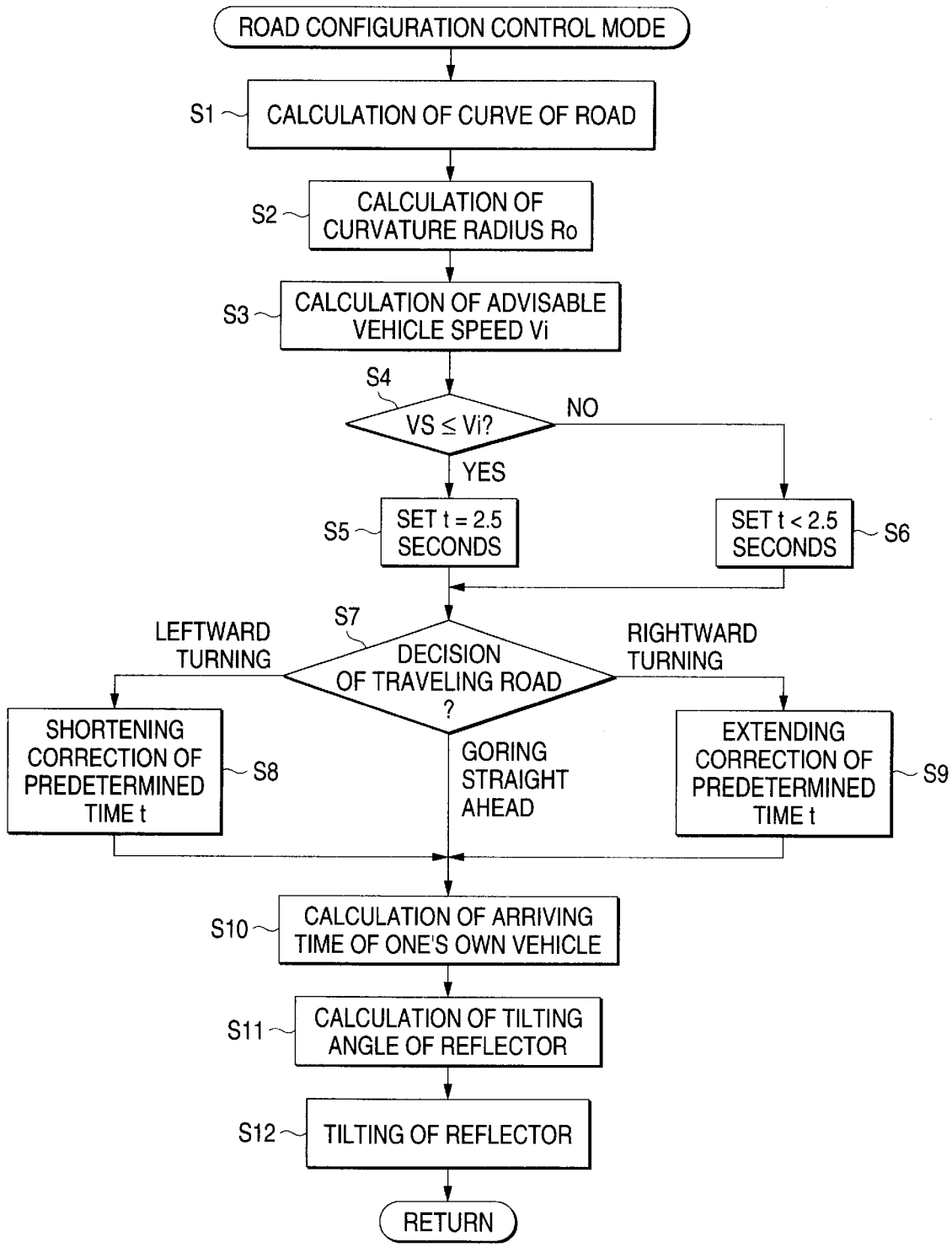
FIG. 16 is a flowchart showing the contents of beam control in the road-configuration control mode.

FIG. 16 is a flowchart for showing the contents of beam control in the road-configuration-control mode.

First, the curve of the traveling road ahead of the vehicle is calculated (S1) with the present position of the vehicle as a reference. The radius of curvature Ro of the traveling road ahead of the vehicle is calculated (S2) according to the calculated results.

Then, the advisable vehicle speed Vi is calculated from the radius of curvature Ro (S3). That is, the advisable vehicle speed Vi is read from the numerical value table (Table 3) showing the relation between the advisable vehicle speed Vi and the radius of curvature Ro. The advisable vehicle speed Vi is calculated so as to compare it and the actual vehicle speed VS of the vehicle 2 (S4).

As a result of the comparison, if VS≦Vi, the predetermined time t is set at t=2.5 seconds (S5). On the other hand, if VS>Vi, the predetermined time t is set at a value shorter than t=2.5 seconds (S6). More specifically, in case where Vi<VS≦1.5 Vi, for example, the predetermined time t is set at t=2 seconds. Similarly, where VS>1.5 Vi, the predetermined time is set at t=1.5 seconds.

Then, a decision is made on whether or not the traveling road ahead of the vehicle is any one of a rightward-turning road, a leftward-turning road, and a straight road (S7). When the traveling road is the rightward-turning road, correction is made to lengthen the predetermined time t (S9). When the traveling road is the leftward-turning road, correction is made to shorten the predetermined time t. And when the traveling road is the straight-traveling road, no correction is made for the predetermined time t.

The arriving time of one's own vehicle on the turning travel line is calculated on the basis of the predetermined time t thus obtained, the actual vehicle speed VS and the advisable vehicle speed Vi on the traveling road ahead of the vehicle (S10). Further, a tilting angle of the reflector is calculated based on the arriving time of one's own vehicle as the target position TP1 (S11), and after the reflector 28 is tilted by the actuator 30—according to the calculated results (S12)—the first step (S1) is followed again.

As described in detail, according to the this embodiment of the invention, the vehicle headlamp system is arranged so that the beam control ECU 22—for controlling the beams emitted from the bilateral headlamps 20L and 20R—when in the road-configuration control mode, performs beam control at a present time with the arriving position of one's own vehicle the predetermined time t later as the target position TP1. Additionally, the beam control ECU 22 also operates to calculate the radius of curvature of the traveling road ahead of the vehicle on the basis of data from the navigation unit 16, and estimates the arriving position of one's own vehicle on the basis of the advisable vehicle speed Vi that corresponds to the radius of curvature Ro. Accordingly, the following operation/working effect is achievable.

When the arriving position of one's own vehicle is estimated with only the vehicle speed at the present time (the actual vehicle speed VS) as a reference, the actual arriving position of one's own vehicle may greatly differ from the value estimated in accordance with the road configuration ahead of the vehicle. However, if the arriving position of one's own vehicle is estimated on the basis of an advisable vehicle speed Vi that corresponds to the calculated radius of curvature Ro of the traveling road ahead of the vehicle, the arriving position of one's own vehicle can accurately be estimated by taking into consideration variation in vehicle speed that is likely to occur in the near future.

In the vehicle headlamp system so arranged as to perform beam control over the headlamps according to the this embodiment of the invention, the arriving position of one's own vehicle the predetermined time later—used as the target position of beam control—can thus be estimated accurately, whereby the road surface ahead of the vehicle is sufficiently irradiated.

In particular, according to this embodiment of the invention, the results of simulations have proved it optimal that when the vehicle turns at the advisable vehicle speed Vi, the target position TP1—of beam control in the road-configuration control mode—is set at the arriving position of one's own vehicle 2.5 seconds later from the present time. Therefore, the predetermined time t is set at 2.5 seconds, whereby the road surface ahead of the vehicle can be irradiated with great efficiency.

Because the arriving position of one's own vehicle is shifted to a position farther than the estimated position when the actual vehicle speed VS of the vehicle 2 is greater than the advisable vehicle speed Vi, then correction is made to shorten the predetermined time t as the actual speed VS grows higher than the advisable vehicle speed Vi. By doing to, there can be prevented a decrease in the accuracy of estimation of the arriving position of one's own vehicle, even though the advisable vehicle speed Vi is not observed on the traveling road ahead of the vehicle.

According to this embodiment of the invention, correction is made to lengthen the predetermined time t in the case of a rightward-turning road, where the actual turning radius R of the turning travel line becomes greater than the radius of curvature Ro of the traveling road ahead of the vehicle in a keep-to-the-left driving system. Also, correction is made to shorten the predetermined time t in the case of a leftward-turning road. Therefore, the accuracy of estimation of the arriving position of one's own vehicle further can be increased.

Further, although the arriving position of one's own vehicle is estimated on the basis of the advisable vehicle speed Vi when beam control is performed in the road-configuration control mode, the arriving position of one's own vehicle can also be estimated on the basis of the marginal turning speed Vc when beam control is performed in the intersection-control mode. It is thus possible to increase the accuracy of the target position TP2 under beam control in the intersection-control mode.

A description has been given of a case where the luminous intensity distribution P—formed by beam emission from the headlamp 24 of each of the bilateral headlamps 20L and 20R—is a low-beam luminous intensity distribution. However, an operation/working effect similar to what is described in the aforementioned embodiment of the invention can be achieved by performing beam control—similar to what is described in the aforementioned embodiment of the invention—even when beam emission is carried out with a high-beam luminous intensity distribution, through a beam switching operation.

A description has been given of a case where the reflector 28, of each of the bilateral headlamps 20L and 20R, comprises the bilaterally tiltable headlamp 24, and the cornering lamp 26 is capable of dimming. However, any lamp constitution other than the aforementioned one can be adopted. When there is adopted an arrangement comprising: a headlamp 24 whose beam emission range is changeable, and a cornering lamp 26 whose beam emitting direction is changeable; or including any lamp other than the headlamp 24, and the cornering lamp 26; or comprising the headlamp 24, a fog lamp, and so forth, an operation/working effect similar to what is described in the aforementioned embodiment of the invention can still be achieved.

Although the navigation unit 16 is employed as a means for detecting the configuration of the road ahead of the vehicle, an image processing unit having a CCD camera can be employed instead.

The present invention is not limited to the specific above-described embodiments. It is contemplated that numerous modifications may be made to the vehicle headlamp system of the present invention without departing from the spirit and scope of the invention as defined in the following claims.

What is claimed is:

1. A vehicle headlamp system comprising:
headlamps for emitting beams forward from a vehicle, and beam control means for controlling the beams emitted from said headlamps,
road-configuration detection means for detecting a road configuration ahead of the vehicle; and
means for estimating the arriving position of one's own vehicle a predetermined time later,
wherein said beam control means performs said beam control with said arriving position of one's own vehicle as a target position, and
wherein said means for estimating the arriving position of one's own vehicle calculates the radius of curvature of a traveling road ahead of the vehicle from the results detected by said road configuration detection means so as to estimate the arriving position of one's own vehicle on the basis of an advisable vehicle speed corresponding to the radius of curvature thus calculated.

2. A vehicle headlamp system as claimed in claim 1, wherein said predetermined time is set at a value ranging from 1.5 to 3.5 seconds.

3. A vehicle headlamp system as claimed in claim 2, wherein said means for estimating the arriving position of one's own vehicle compares said advisable vehicle speed and the actual vehicle speed so as to subject said predetermined time to increase/decrease correction according to the difference between said advisable vehicle speed and said actual vehicle speed.

4. A vehicle headlamp system as claimed in claim 3, wherein said increase/decrease correction is made to shorten said predetermined time as said actual vehicle speed grows higher than said advisable vehicle speed.

5. A vehicle headlamp system as claimed in claim 4, wherein said means for estimating the arriving position of one's own vehicle estimates said arriving position of one's own vehicle by setting said predetermined time at different values depending on whether there is a rightward or leftward turning road ahead of the vehicle.

6. A vehicle headlamp system as claimed in claim 5, wherein said predetermined time for the rightward-turning road is set at a value greater than the value set for the leftward-turning road in a keep-to-the-left traffic environment, and wherein said predetermined time for the leftward-turning road is set at a value greater than the value set for the rightward-turning road in a keep-to-the-right traffic environment.

7. A vehicle headlamp system as claimed in claim 3, wherein said means for estimating the arriving position of one's own vehicle estimates said arriving position of one's own vehicle by setting said predetermined time at different values depending on whether there is a rightward or leftward turning road ahead of the vehicle.

8. A vehicle headlamp system as claimed in claim 7, wherein said predetermined time for the rightward-turning road is set at a value greater than the value set for the leftward-turning road in a keep-to-the-left traffic environment, and wherein said predetermined time for the leftward-turning road is set at a value greater than the value set for the rightward-turning road in a keep-to-the-right traffic environment.

9. A vehicle headlamp system as claimed in claim 2, wherein said means for estimating the arriving position of one's own vehicle estimates said arriving position of one's own vehicle by setting said predetermined time at different values depending on whether there is a rightward or leftward turning road ahead of the vehicle.

10. A vehicle headlamp system as claimed in claim 9, wherein said predetermined time for the rightward-turning road is set at a value greater than the value set for the leftward-turning road in a keep-to-the-left traffic environment, and wherein said predetermined time for the leftward-turning road is set at a value greater than the value set for the rightward-turning road in a keep-to-the-right traffic environment.

11. A vehicle headlamp system as claimed in claim 1, wherein said means for estimating the arriving position of one's own vehicle compares said advisable vehicle speed and the actual vehicle speed so as to subject said predetermined time to increase/decrease correction according to the difference between said advisable vehicle speed and said actual vehicle speed.

12. A vehicle headlamp system as claimed in claim 11, wherein said means for estimating the arriving position of one's own vehicle estimates said arriving position of one's own vehicle by setting said predetermined time at different values depending on whether there is a rightward or leftward turning road ahead of the vehicle.

13. A vehicle headlamp system as claimed in claim 12, wherein said predetermined time for the rightward-turning road is set at a value greater than the value set for the leftward-turning road in a keep-to-the-left traffic environment, and wherein said predetermined time for the leftward-turning road is set at a value greater than the value set for the rightward-turning road in a keep-to-the-right traffic environment.

14. A vehicle headlamp system as claimed in claim 1, wherein said means for estimating the arriving position of one's own vehicle estimates said arriving position of one's own vehicle by setting said predetermined time at different values depending on whether there is a rightward or leftward turning road ahead of the vehicle.

15. A vehicle headlamp system as claimed in claim 14, wherein said predetermined time for the rightward-turning road is set at a value greater than the value set for the leftward-turning road in a keep-to-the-left traffic environment, and wherein said predetermined time for the leftward-turning road is set at a value greater than the value set for the rightward-turning road in a keep-to-the-right traffic environment.

16. A vehicle headlamp system comprising:
headlamps for emitting beams forward from a vehicle, and a beam control ECU that controls the beams emitted form said headlamps;
a road configuration detection unit including a global positioning system, a gyro sensor, and a CD-ROM;
a vehicle speed sensor;
a navigation unit ECU, connected to said road configuration detection unit, to said beam control ECU, and to said vehicle speed sensor, wherein said navigation unit ECU is programmed to estimate the arriving position of one's own vehicle a predetermined time later,
wherein said beam control ECU is programmed to perform beam control with said arriving position of one's own vehicle as a target position, which is received from said navigation unit ECU, and
wherein aid navigation unit ECU is programmed to calculate the radius of curvature of a traveling road ahead of the vehicle from signals sent from said road configuration detection unit, so as to estimate the arriving position of one's own vehicle on the basis of an advisable vehicle speed corresponding to the radius of curvature thus calculated.

* * * * *